(12) United States Patent
Sato et al.

(10) Patent No.: US 7,277,987 B2
(45) Date of Patent: Oct. 2, 2007

(54) INFORMATION PROCESSING APPARATUS, STORAGE MEDIUM SUPPORTING DEVICE, AND IDENTIFIER CHANGING METHOD

(75) Inventors: Asami Sato, Kanagawa (JP); Masahiro Ando, Kanagawa (JP); Koji Kimura, Tokyo (JP); Michihiko Tsunekawa, Kanagawa (JP); Hideaki Kajihara, Kanagawa (JP); Tsutomu Shimada, Tokyo (JP)

(73) Assignee: Canon Kabushiki Kaisha (JP)

( * ) Notice: Subject to any disclaimer, the term of this patent is extended or adjusted under 35 U.S.C. 154(b) by 414 days.

(21) Appl. No.: 10/852,953

(22) Filed: May 24, 2004

(65) Prior Publication Data

US 2004/0255206 A1 Dec. 16, 2004

(30) Foreign Application Priority Data

| May 26, 2003 | (JP) | ............................. 2003-147843 |
| May 28, 2003 | (JP) | ............................. 2003-151015 |
| May 28, 2003 | (JP) | ............................. 2003-151016 |

(51) Int. Cl.
*G06F 12/00* (2006.01)
*G11B 23/40* (2006.01)

(52) U.S. Cl. ...................... 711/114; 369/52.1; 711/111; 711/115

(58) Field of Classification Search ...................... None
See application file for complete search history.

(56) References Cited

U.S. PATENT DOCUMENTS

| 4,400,161 A | * | 8/1983 | Gerlt | .......................... 434/104 |
| 5,301,293 A | * | 4/1994 | Kano | .......................... 711/112 |
| 6,920,527 B2 | * | 7/2005 | Cloutier et al. | ............. 711/115 |
| 7,030,774 B2 | * | 4/2006 | Krenz et al. | ........... 340/815.47 |

FOREIGN PATENT DOCUMENTS

| JP | 10-198527 A | 7/1998 |
| JP | 11-282636 A | 10/1999 |
| JP | 2000-194448 A | 7/2000 |
| JP | 2001-229352 A | 8/2001 |
| JP | 2001-291312 A | 10/2001 |

* cited by examiner

*Primary Examiner*—Gary Portka
(74) *Attorney, Agent, or Firm*—Rossi, Kimms & McDowell LLP

(57) ABSTRACT

An information processing apparatus which makes it possible to accurately manage a plurality of storage media realized by cooperation with each other while maintaining a combination or combinations thereof, and manage data for each OS. A storage media supporting device removably supporting at least one storage medium is removably attached to the information processing apparatus. When the storage media supporting device is attached to the information processing apparatus, the storage media housed in the storage media supporting device is electrically connected to the information processing apparatus. The contents of data stored in the storage media are detected, and a visible identifier provided on the storage media supporting device is changed into a state corresponding to the detection result.

12 Claims, 30 Drawing Sheets

INFORMATION PROCESSING APPARATUS, STORAGE MEDIUM SUPPORTING DEVICE, AND IDENTIFIER CHANGING METHOD

BACKGROUND OF THE INVENTION

1. Field of the Invention

The present invention relates to an information processing apparatus such as a server or a personal computer, a storage media supporting device which can be inserted into and ejected from the information processing apparatus, and to and from which storage media such as hard disk drives can be inserted and ejected, and a method of changing an identifier which is provided in the storage media supporting device.

2. Description of the Related Art

With the recent advancement of information society, some information processing apparatuses such as servers or personal computers have become capable of housing a plurality of storage media such as hard disk drives. Namely, an information processing apparatus capable of housing a plurality of storage media has been developed so as to deal with an increase in the amount of data to be processed, or to construct a RAID (Redundant Arrays of Inexpensive Disks) system to thereby respond to addition of a data backup function of automatically recovering data on a defective storage medium on a spare storage medium using redundant data and automatically copying the recovered data on the spare storage medium to another storage medium.

The information processing apparatus capable of housing a plurality of storage media is provided with a mechanism for inserting and ejecting the plurality of storage media into and from the information processing apparatus, so that the plurality of storage media can be stored even outside the information processing apparatus. This makes it possible to safely store a larger amount of data or a wider variety of data.

To store a plurality of storage media, which has been removed from the information processing apparatus capable of housing a plurality of storage media, outside the information processing apparatus, it is necessary to manage the plurality of storage media with the contents of data stored therein identified, but conventionally, the storage media are separately managed according to e.g. respective labels attached thereto.

Also, a hard disk device which is removably attached to an information processing apparatus has been conventionally proposed (refer to Japanese Laid-Open Patent Publication (Kokai) No. 2001-291312).

However, in a system realized by cooperation between a plurality of storage media, such as the above-mentioned RAID system, if a plurality of storage media are stored and managed outside an information processing apparatus, storing the storage media with respective identifiers provided thereon is not effective in terms of management.

This is because a plurality of storage media realized by cooperation with each other should be stored with their combination or combinations being maintained even outside the information processing apparatus, and it is more effective to manage the combination of the storage media according to an identifier or identifiers provided on the combination or combinations. Also, data created by different OSs (operating systems) can be easily managed if they are stored and identified according to the combinations of the OSs and the data.

Further, in the above described conventional method in which storage media are stored and managed according to respective identifiers such as labels attached thereto, data stored in the storage medium cannot be detected or discriminated before the storage media stored and managed outside the information processing apparatus are inserted into and activated in the information processing apparatus. Therefore, it is impossible to prepare in advance a starting process (i.e. a process for starting the information processing apparatus and starting reading data from and/or writing data into the storage media) suitable for the data stored in the storage media.

Further, the above conventional RAID system is incorporated in advance into the main body of an information processing apparatus, but there has also been proposed a RAID system in which a plurality of storage media are configured as a unit, and collectively attached to and removed from the main body of an information processing apparatus. In this RAID system, the storage media can be easily attached and removed, and effectively managed even off-line outside the main body of the information processing apparatus (refer to Japanese Laid-Open Patent Publication (Kokai) No. H11-282636, for example).

Further, since the above conventional RAID system is arranged such that a plurality of storage media back up data for each other, and hence the storage media constituting the RAID system must be capable of normally operating, and it is necessary to immediately replace defective storage media. If defective storage media are left as they are, information stored in the RAID system may not be read out. Therefore, a RAID system has been proposed which is configured such that if there is any defective storage medium among a plurality of storage media, the defective storage medium removably connected to a data path by a failure determining means is released, and is protruded from the front face of the housing of the information processing apparatus by an urging means (refer to Japanese Laid-Open Patent Publication (Kokai) No. H10-198527, for example). Thus, this RAID system facilitates replacement by identifying a defective storage medium among a plurality of storage media which can be removably attached to the information processing apparatus.

In the former RAID system disclosed in Japanese Laid-Open Patent Publication (Kokai) No. H11-282636, when the presence of a defective storage medium is detected among a plurality of storage media incorporated in a removable unit intended to collectively attach/remove the storage media to/from the information processing apparatus, a user has to know failure information and know the location of the defective storage medium via a display means such as a CRT (Cathode Ray Tube) provided in the information processing apparatus, since there is no means for displaying failure information. In this case, if the location where the removable unit is housed in the information processing apparatus is away from the location of the display means such as a CRT, or if the display means cannot be seen when the removable unit is ejected from the information processing apparatus, the user has to identify and eject the defective storage medium by following his/her memory of the location of the defective storage medium indicated by the display means, and therefore, in many cases, he/she ejects and discards a non-defective storage medium without ejecting defective storage medium due to selection error caused by memory slip.

Also, in the latter RAID system disclosed in Japanese Laid-Open Patent Publication (Kokai) No. H10-198527, an actuator such as an electromagnet releases a defective storage medium from a hook via which it is hooked to the housing, so that the defective storage medium is removed.

Therefore, to remove a specific storage medium among a plurality of storage media, it is necessary to carry out such a complex operation that the electromagnetic is activated to release the storage medium from the hook. Furthermore, to remove and store storage media in a safe place so as to ensure security, it is necessary to repeatedly release the storage media from hooks a number of times corresponding to the number of storage media. Further, when it is impossible to release a defective storage medium due to a failure in a controller for the RAID system, the defective storage medium is forced to be left in the state of being hooked. The same problem arises when it is impossible to start the RAID system due to e.g. blackout. Further, if a plurality of storage media realized by cooperation with each other are separately stored, there is the possibility that some storage media are mixed up with other storage media.

Further, the former RAID system has a problem as below if the removable unit is stored in the state removed from the information processing apparatus, or if a plurality of users share the removable unit. Specifically, since a plurality of removable storage media are housed in the removable unit, the entire removable unit may malfunction when some of the storage media are removed from the removable unit due to theft or loss, or other unexpected storage media are attached to the removable unit, or the positions of storage media in the removable unit are changed. If a physical key is provided for the removable unit so as to address this problem, a large number of physical keys must be prepared if a large number of removable units are used in e.g. a company, and this complicates management of removable units. Further, if a cover with an electronic lock is attached to an information processing apparatus as disclosed in Japanese Laid-Open Patent Publication (Kokai) No. 2000-194448, a removable unit must be stored and managed in the state attached to the information processing apparatus, and this raises a problem in terms of information security.

SUMMARY OF THE INVENTION

It is a first object of the present invention to provide an information processing apparatus, a storage media supporting device, and an identifier changing method, which make it possible to accurately manage a plurality of storage media realized by cooperation with each other while maintaining a combination or combinations thereof, and manage data for each OS.

It is a second object of the present invention to provide a storage media supporting device which makes it possible to clearly specify a defective storage medium at the time of removal thereof without providing an electric driving source or depending on a display means such as a CRT.

It is a third object of the present invention to provide a storage media supporting device which can be easily managed while securing information security.

To attain the first object, in a first aspect of the present invention, there is provided an information processing apparatus to which a storage media supporting device supporting at least one storage medium is removably attached, comprising connecting means for electrically connecting to the storage medium within the storage media supporting device when the storage media supporting device is attached to the information processing apparatus, contents detecting means for detecting contents of data stored in the storage medium via the connecting means, and control means for changing a visible identifier provided on the storage media supporting device into a state corresponding to a result of detection by the contents detecting means.

To attain the first object, in a second aspect of the present invention, there is provided a storage media supporting device that supports at least one storage medium and is removably attached to an information processing apparatus, comprising a housing, a visible identifier provided on the housing, and transmitting means for transmitting contents of data stored in the storage medium to the information processing apparatus according to control provided by the information processing apparatus when the storage media supporting device is attached to the information processing apparatus, wherein the identifier is changed according to control provided by the information processing apparatus into a state corresponding to a result of detection by the information processing apparatus based on the contents of data transmitted by the transmitting means.

To attain the first object, in a third aspect of the present invention, there is provided an identifier changing method executed by an information processing apparatus to which a storage media supporting device supporting at least one storage medium is removably attached, comprising the steps of electrically connecting the information processing apparatus to the storage medium within the storage media supporting device when the storage media supporting device is attached to the information processing apparatus, detecting contents of data stored in the storage medium, and changing a visible identifier provided on the storage media supporting device into a state corresponding to a result of detection at the detecting step.

To attain the second object, in a fourth aspect of the present invention, there is provided a storage media supporting device including a housing section which houses a plurality of storage media, the storage media supporting device removably attaching the plurality of storage media to an information processing apparatus, comprising urging means for causing elastic members to separately displace respective ones of the plurality of storage media in an ejecting direction from the housing section, and switching means for switching between an inhibited state in which the urging means is inhibited from displacing the storage media, and a permitted state in which the urging means is permitted to displace the storage media, wherein when detecting means provided in the information processing apparatus, for detecting a defective storage medium, detects a defective storage medium, operating means provided in the information processing apparatus causes the switching means to switch the defective storage medium into the permitted state, and when the storage media supporting device is removed from the information processing apparatus, the defective storage medium projects from the housing section.

To attain the second object, in a fifth aspect of the present invention, there is provided a storage media supporting device comprising housing means for separately housing a plurality of storage media, urging means for urging each of the plurality of storage media to be displaced in an ejecting direction from the housing means, cover means for covering the housing section, and restricting means for separately restricting displacement of the storage media by the urging means, wherein, when the cover means is opened, a storage medium unrestricted by the restricting means is displaced in the ejecting direction from the housing means.

To attain the third object, in a sixth aspect of the present invention, there is provided a storage media supporting device including a housing section which houses a plurality of storage media, the storage media supporting device removably attaching the plurality of storage media to an information processing apparatus, comprising an openable and closable cover provided at an entrance of the housing section, for restricting ejection of the plurality of storage media, and switching means operable when the openable and closable cover is closed, to selectively switch between a released state in which the openable and closable cover can be opened, and an inhibited state in which the openable and closable cover cannot be opened, wherein whether the opening/closing cover can be opened when the storage media supporting device is removed from the information processing apparatus is determined in a state in which the storage media supporting device is attached to the information processing apparatus.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
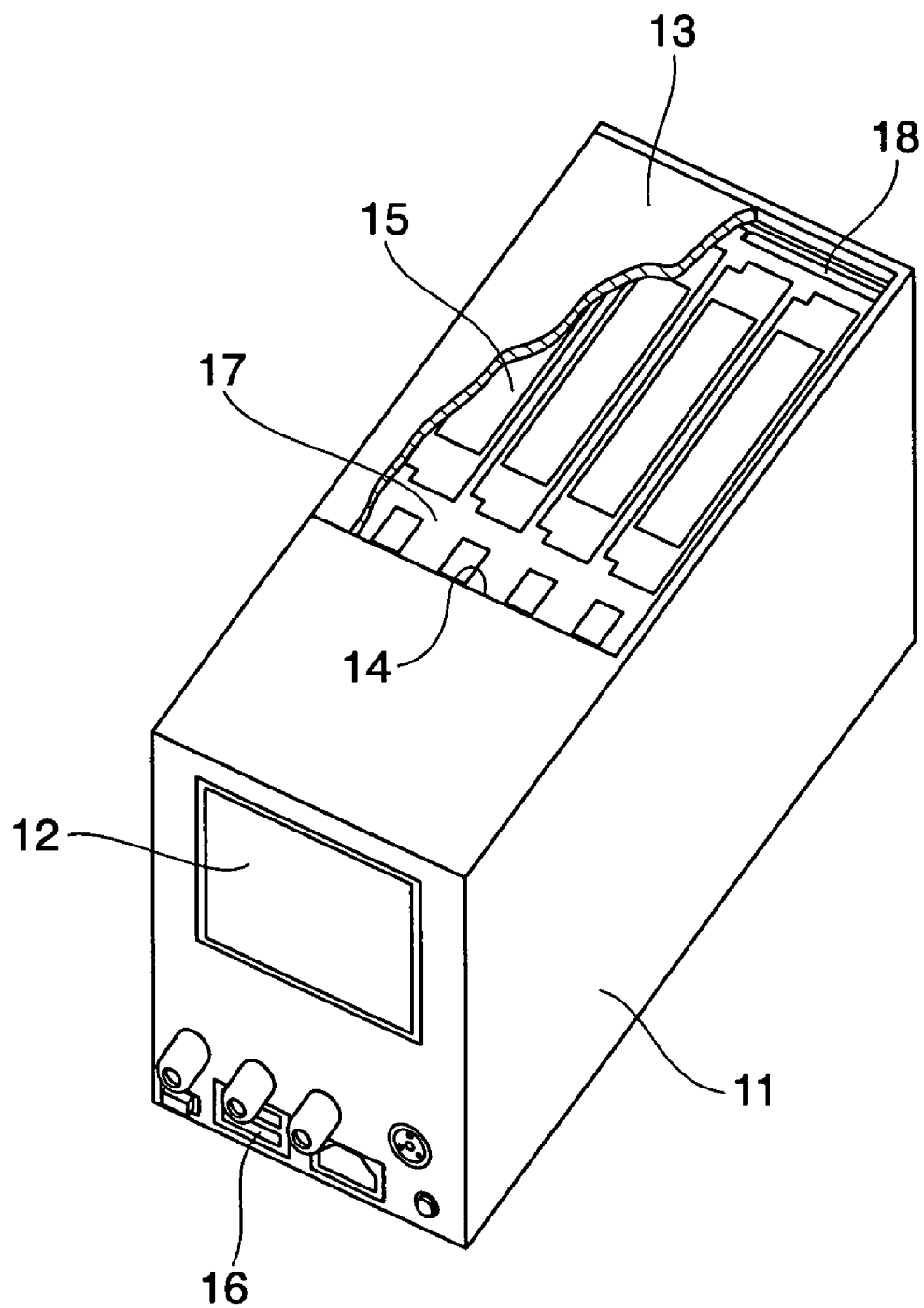
FIG. 1 is a perspective cutaway view showing an information processing apparatus to which a storage media supporting device according to a first embodiment of the present invention is attached.

FIG. 1 is a perspective view, partially cutaway, showing an information processing apparatus 11 to which a storage media supporting device 17 according to a first embodiment of the present invention is attached.

As shown in FIG. 1, the information processing apparatus 11 is implemented by a computer or a database system, and a housing for the information processing apparatus 11 is comprised of a front panel 12, an outer cover 13, an opening 14, and various connector jacks 16.

The front panel 12 is provided at the front of the information processing apparatus 11, and includes a display section for displaying the operative status of the information processing apparatus 11 and an operating section for instructing the information processing apparatus 11 to carry out operations. The outer cover 13 is provided on top of the information processing apparatus 11, and is capable of being opened and closed (refer to FIG. 2). The opening 14 is for inserting and ejecting the storage media supporting device 17, and is opened and closed by the outer cover 13. The connector jacks 16 are for connecting other electronic devices to the information processing apparatus 11 so as to send and receive various kinds of data as described below.

The storage media supporting device 17 is attached to the information processing apparatus 11 such that it can be inserted into and ejected from (attached to and removed from) the information processing apparatus 11. A plurality of (e.g. four) storage media 15 are supported in the storage media supporting device 17. The storage media 15 can be inserted into and ejected from (attached to and removed from) the storage media supporting device 17, and store electronic data accumulated in various electronic devices such as an electronic data book and an electronic camera, application programs, or OS system data, for example. The information processing apparatus 11 reads and writes such data from and into the storage media 15.

Figure 2:
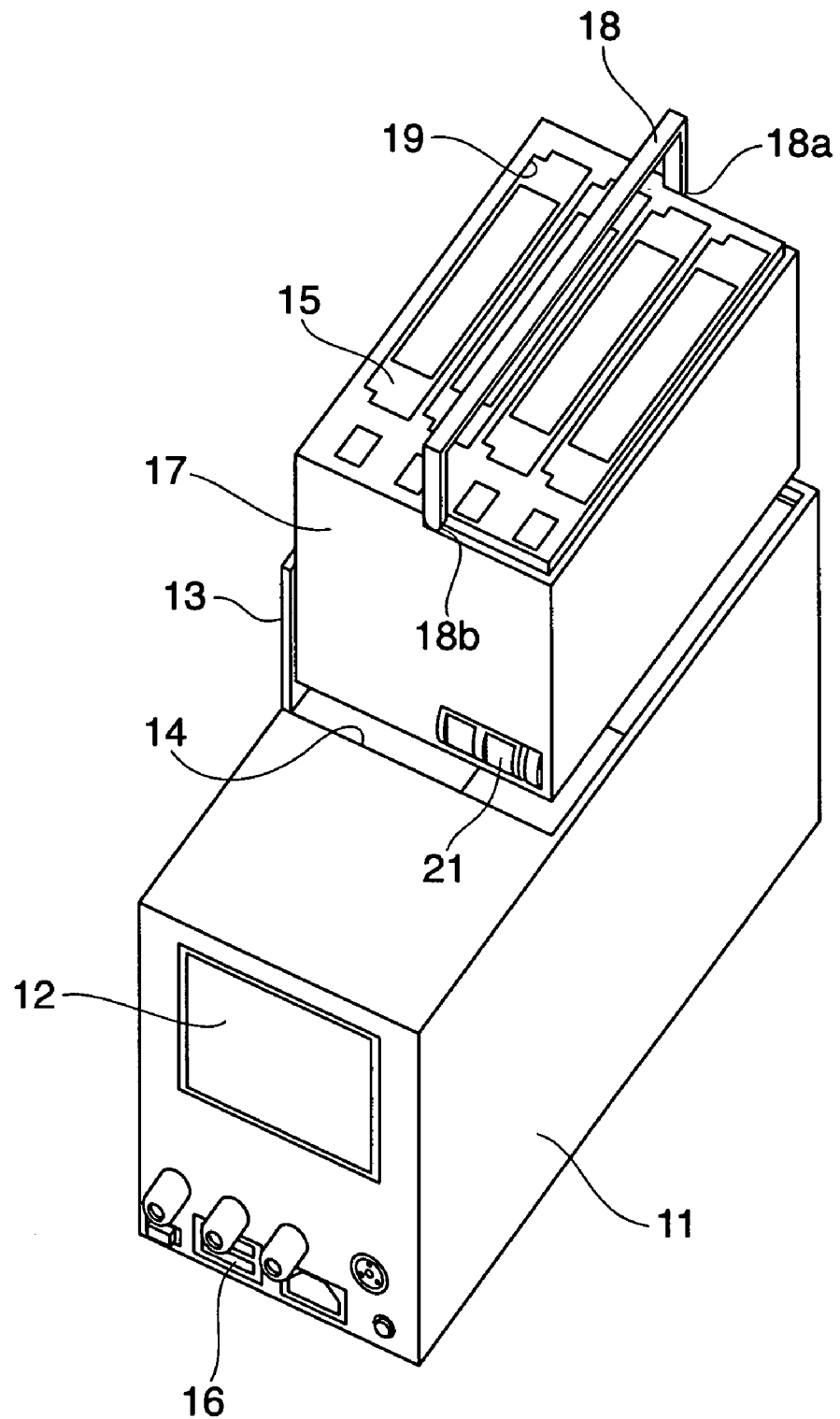
FIG. 2 is a perspective view showing a state in which the storage media supporting device is being discharged from the information processing apparatus.

FIG. 2 is a perspective view showing a state in which the storage media supporting device 17 is being ejected from the information processing apparatus 11.

As shown in FIG. 2, the storage media supporting device 17 is basket-shaped so as to collectively support (house) the plurality of storage media 15, and is provided with storage medium housing sections 19 provided for the respective storage media 15, a handle 18, and a display part 21 (identifier). The handle 18 can be folded (refer to FIG. 1), and is provided on top of the storage media supporting device 17 such that it can rotate about mounting sections 18a and 18b. By opening the outer cover 13 and holding the handle 18, the user can attach/remove the storage media supporting device 17 to/from the information processing apparatus 11 via the opening 14. The display part 21 will be described later.

When the storage media supporting device 17 is attached to the information processing apparatus 11, the plurality of storage media 15 supported in the storage media supporting device 17 are electrically connected to respective corresponding connectors, not shown, provided in the information processing apparatus 11. With this electric connection, a CPU, described later, of the information processing apparatus 11 can detect the contents of various kinds of data stored in the storage media 15, and can also read and write various kinds of data to and from the respective storage media 15.

Figure 3:
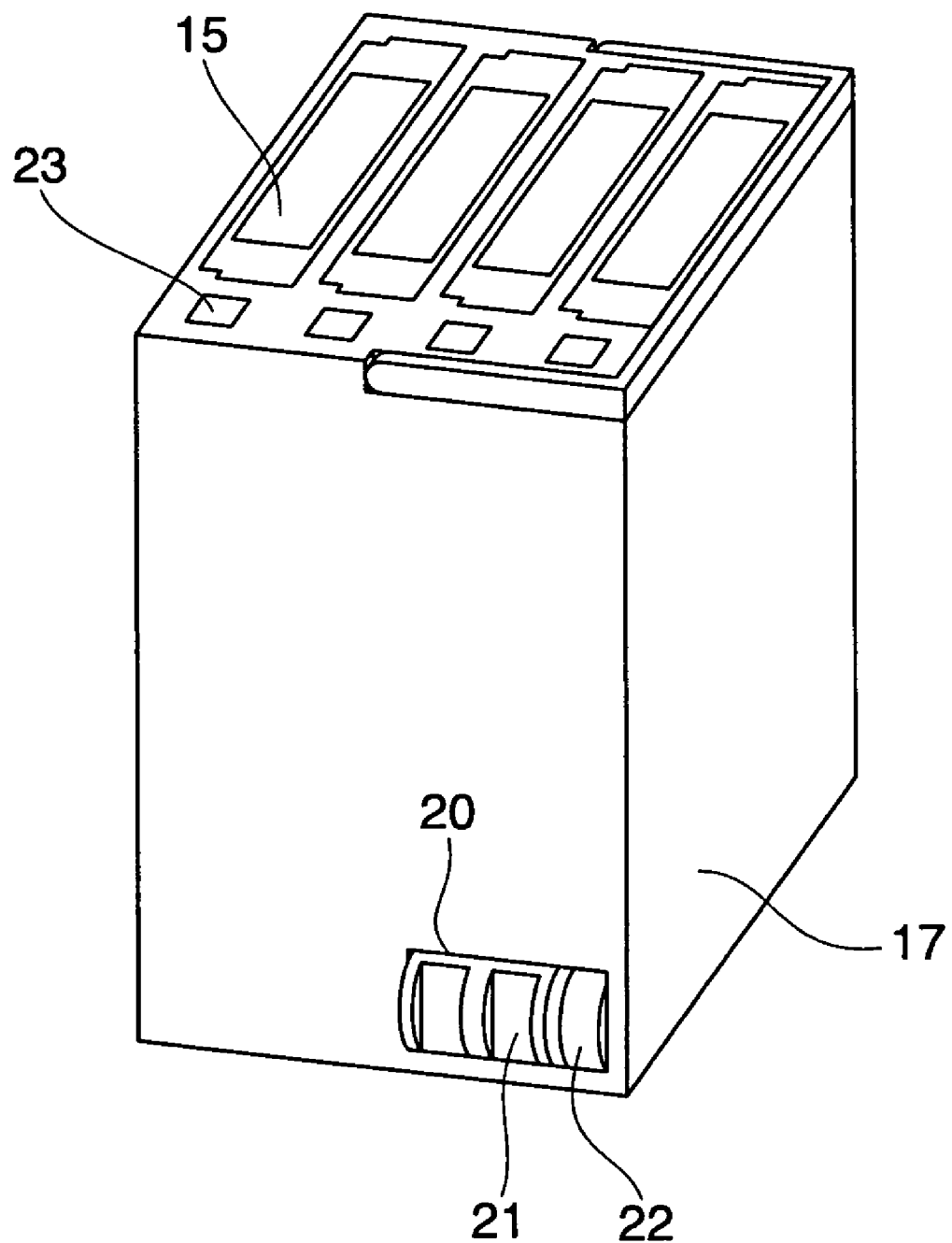
FIG. 3 is a perspective view showing the storage media supporting device in which a display part indicates the presence of system data in storage media.
Figure 4:
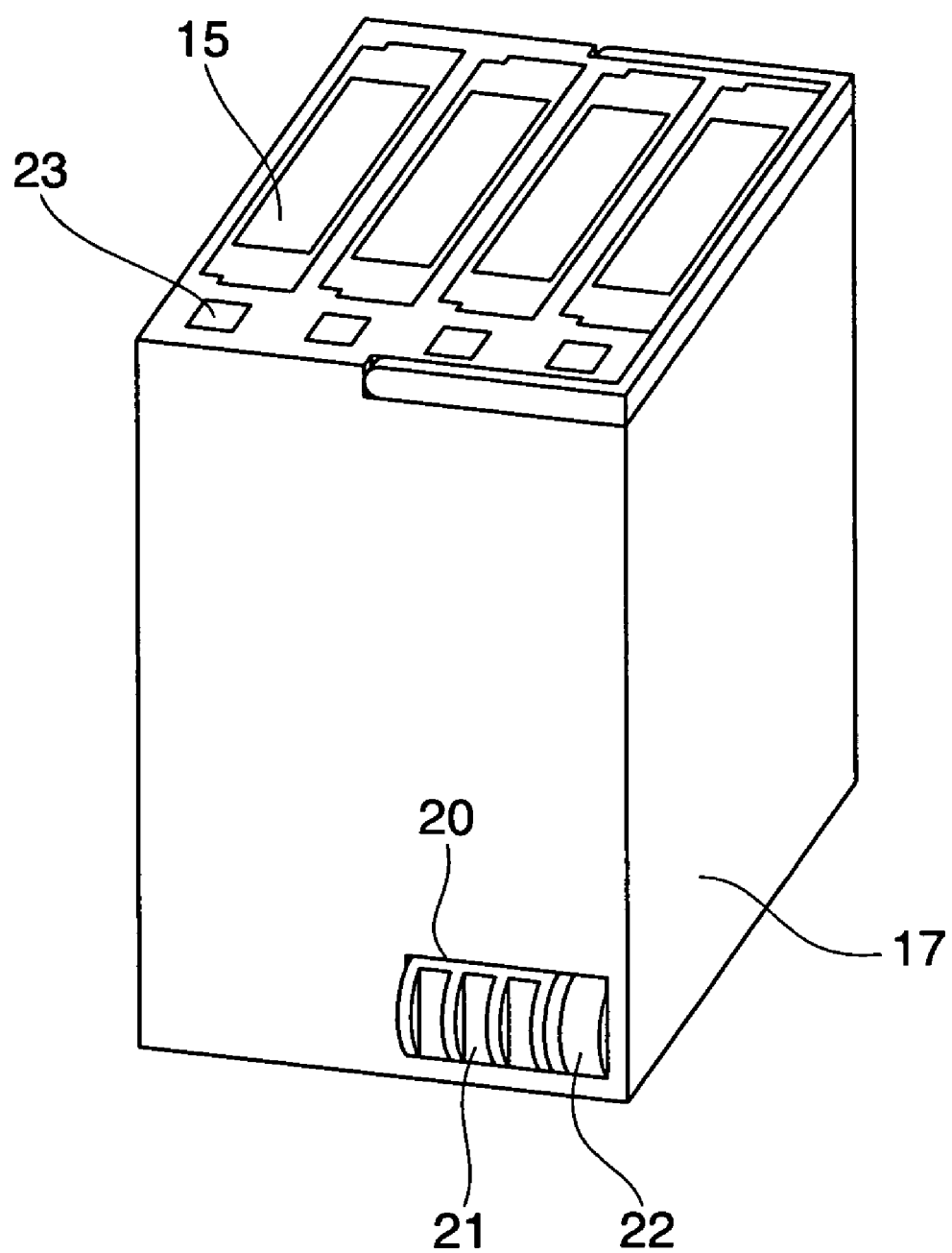
FIG. 4 is a perspective view showing the storage media supporting device in which the display part indicates the absence of system data in storage media.

FIG. 3 is a perspective view showing the storage media supporting device 17 in which the display part 21 indicates the presence of system data in the storage media 15, and FIG. 4 is a perspective view showing the storage media supporting device 17 in which the display part 21 indicates the absence of system data in the storage media 15.

As shown in FIGS. 3 and 4, the storage media supporting device 17 is provided with the display part 21 which is e.g. cylindrical (refer to FIG. 8), for displaying the setting condition of the RAID system, and a dial 22. The display part 21 is disposed so as to be viewed from outside through a cutout section 20 formed in a housing for the storage media supporting device 17. The dial 22 is connected to the display part 21 (refer to FIG. 6). The display part 21 can be manually rotated by turning the dial 22 with a finger, or automatically rotated via a stepping motor 25, described later.

Also, the display part 21 has a rotary surface thereof formed with a plurality of display patterns. For example, the display part 21 can indicate what kind of data is stored in storage medium supported in the storage media supporting device 17, i.e. whether the storage media are RAID system disks storing data for activating the RAID system, data disks storing normal data, unused disks, or other disks. It may be configured such that the display patterns on the display part 21 are optically read, or are mechanically recognized using irregularities formed on surfaces of the display patterns.

As is apparent from FIGS. 3 and 4, the display pattern (e.g. two rectangular patterns are arranged) in FIG. 3 and the display pattern (e.g. three rectangular patterns are arranged) in FIG. 4 are different.

Figure 5:
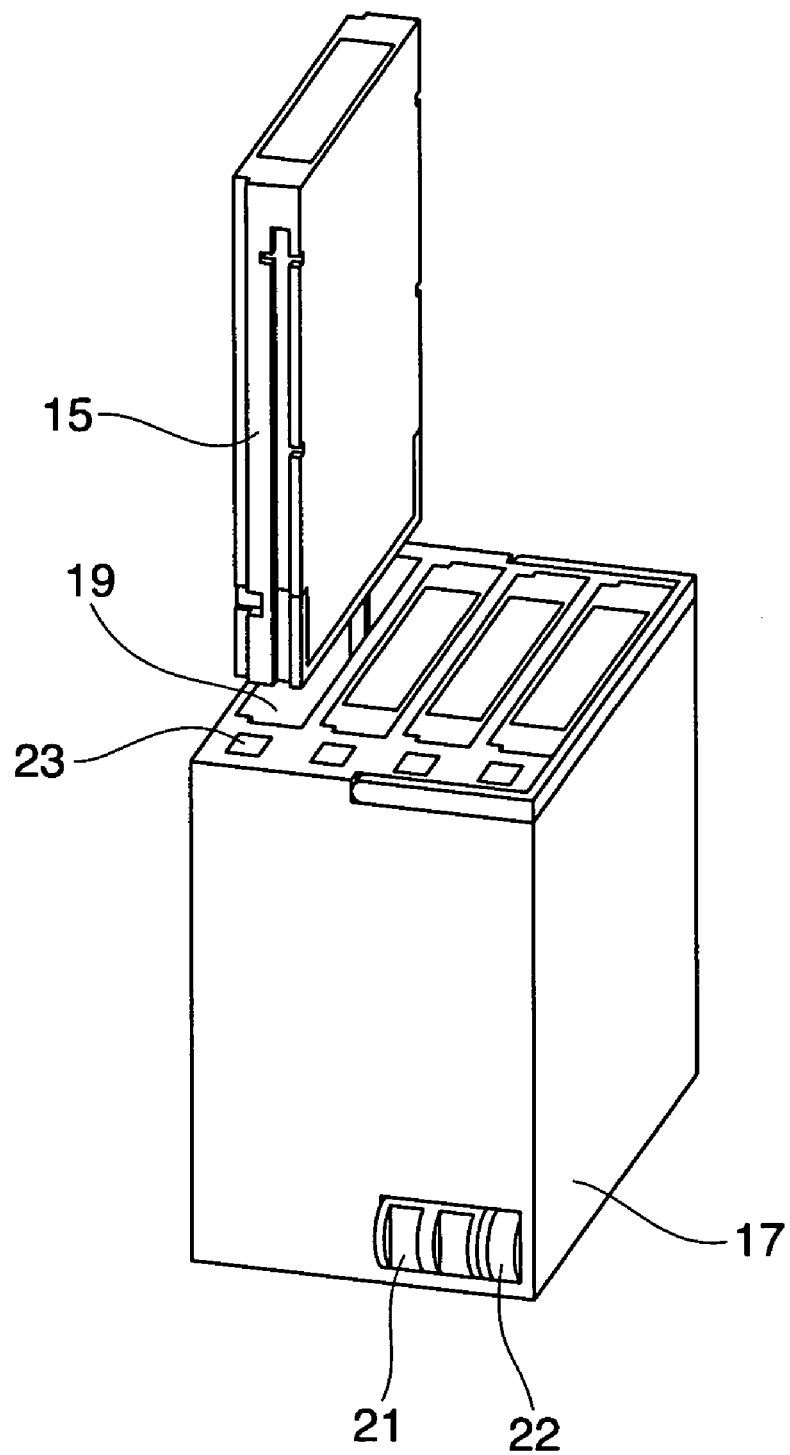
FIG. 5 is a perspective view showing the storage media supporting device according to the first embodiment, from which a storage medium has been ejected.

FIG. 5 is a perspective view showing a state in which a storage medium 15 has been ejected from the storage media supporting device 17.

As shown in FIG. 5, a plurality of eject buttons 23 corresponding to the plurality of storage medium housing sections 19 are arranged on the upper surface of the storage media supporting device 17. By depressing any of the eject buttons 23, the operator can eject and replace the corresponding storage medium 15 housed in the storage medium housing section 19. Similarly, the other storage media 15 housed in the other storage medium storage sections 19 can be replaced by depressing the respective corresponding eject buttons 23.

Figure 6:
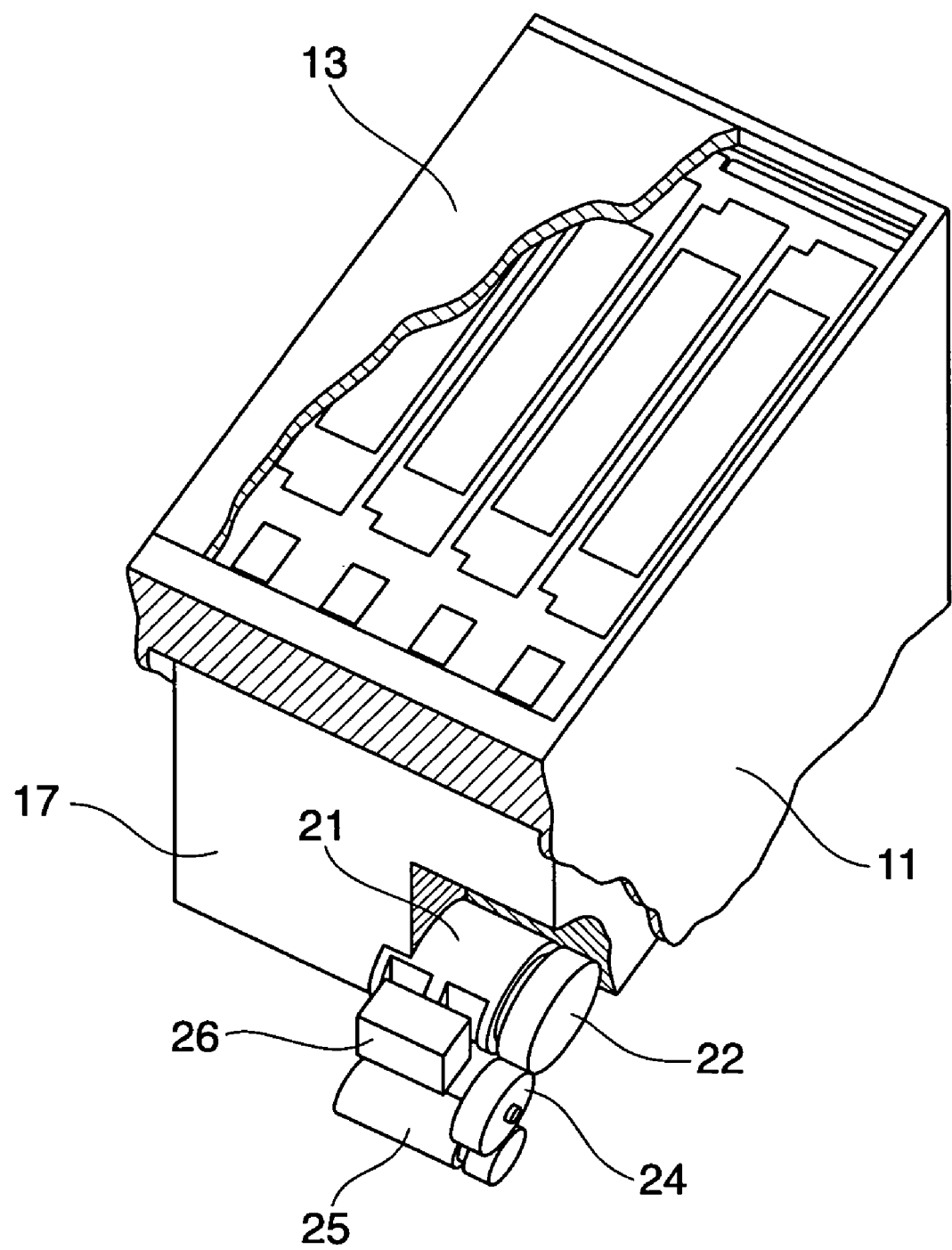
FIG. 6 is a perspective view, partially cutaway, showing the information processing apparatus to which the storage media supporting device according to the first embodiment is attached.

FIG. 6 is a perspective view, partially cutaway, showing the information processing apparatus 11 to which the storage media supporting device 17 is attached.

As shown in FIG. 6, the information processing apparatus 11 is provided with a rotor 24, a stepping motor 25, and a display pattern detector 26.

The rotor 24 is configured to come into contact with the dial 22 connected to the display part 21 of the storage media supporting device 17 in the state in which the storage media supporting device 17 is attached to the information processing apparatus 11. The dial 22 is manually rotatable (with a finger) as mentioned above, and the surface thereof is knurled or grooved, for example. The rotor 24 is also rotatable by the stepping motor 25, and the surface thereof is knurled or grooved, for example, similarly to the dial 22. This facilitates the transmission of a rotational force between the rotor 24 and the dial 22.

It should be noted that the dial 22 and the rotor 24 may be provided with respective gears, not shown, so that the rotational force can be transmitted by engagement of the gears. In this case, the reduction gear ratio can be freely set according to the number of teeth of the gears.

The stepping motor 25 is connected to the rotor 24. The transmission of motor torque to the rotor 24 rotatively drives the rotor 24 to rotate the display part 21 via the rotor 24 and the dial 22. The display pattern detector 26 is for detecting the display pattern of the display part 21 in an arbitrary way e.g. optically, mechanically, or electrically.

Figure 7:
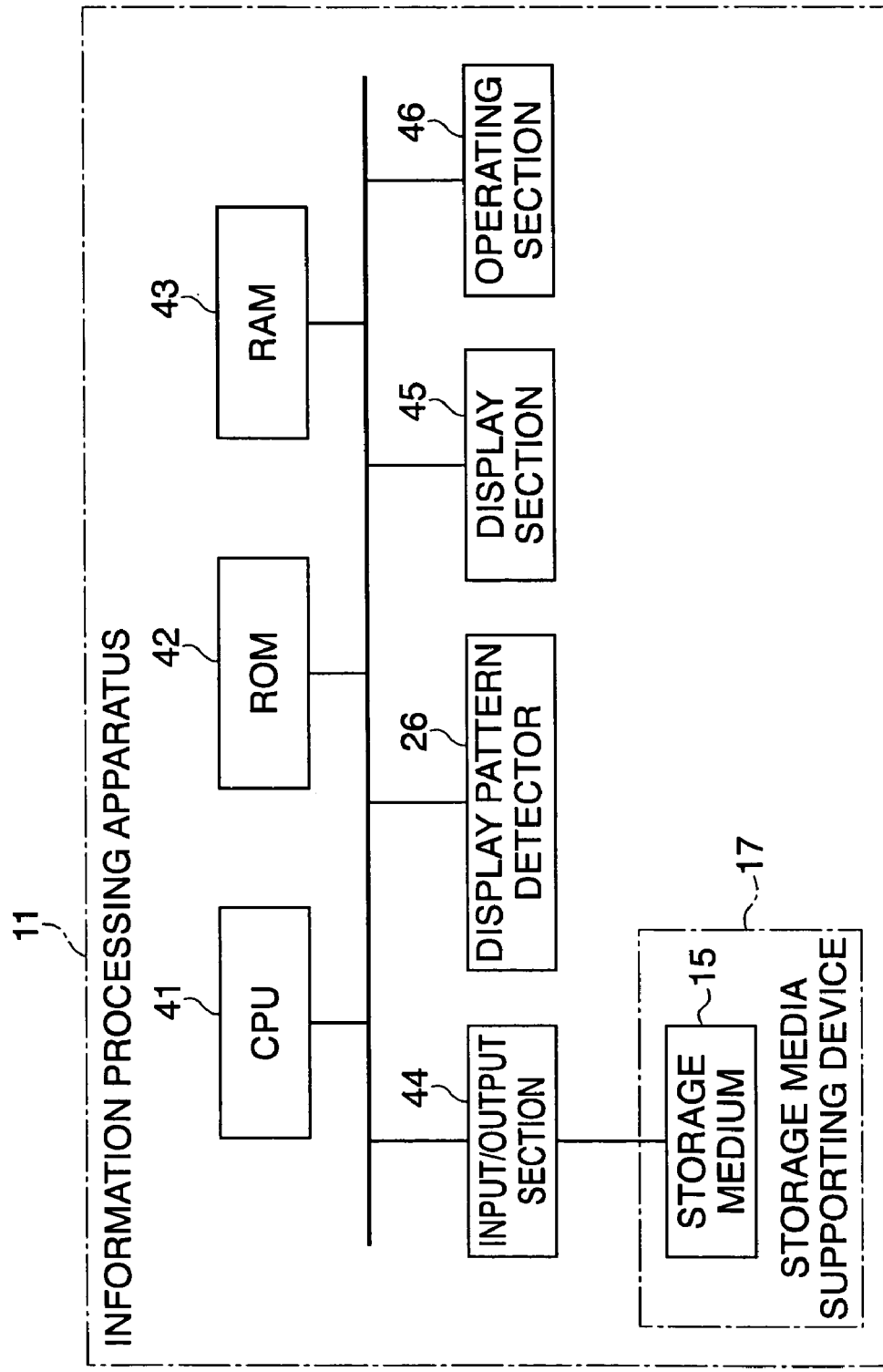
FIG. 7 is a block diagram schematically showing the construction of the information processing apparatus in FIG. 1.

FIG. 7 is a block diagram schematically showing the construction of the information processing apparatus 11.

As shown in FIG. 7, the information processing apparatus 11 is comprised of a CPU (Central Processing Unit) 41, a ROM (Read-Only Memory) 42, a RAM (Random Access Memory) 43, an input/output section 44, the display pattern detector 26, a display section 45, and an operating section 46.

The CPU 41 controls the overall operation of the information processing apparatus 11, and provides various kinds of control as described later; for example, through the above-mentioned connectors, the CPU 41 detects the contents of data stored in the storage media 15 supported in the storage media supporting device 17 in the state in which the storage media supporting device 17 is attached to the information processing apparatus 11, and rotatively drives the stepping motor 25 according to the detection result to set the display pattern of the display part 21. The ROM 42 stores control programs to be executed by the CPU 41 and fixed data. The RAM 43 serves as a work area for operations of the CPU 41, and a temporary data storage region.

The input/output section 44 controls the input/output of data to/from the storage media 15 supported in the storage media supporting device 17 attached to the information processing apparatus 11, and includes the above-mentioned connectors. The display pattern detector 26 detects the display pattern of the display part 21 provided in the storage media supporting device 17. The display section 45 displays the operative status of the information processing apparatus 11. The operating section 46 is for instructing the information processing apparatus 11 to carry out various operations. The display section 45 and the operating section 46 correspond to the display section and the operating section constituting the front panel section 12 described previously with reference to FIGS. 1 and 2. In FIG. 7, only one storage medium 15 is illustrated for the convenience of explanation.

The storage media supporting device 17 has a function of transmitting the contents of data stored in the storage media 15 housed in the storage media supporting device 17 to the information processing apparatus 11 according to detection signals output from the above-mentioned connectors in the state in which the storage media supporting device 17 is attached to the information processing apparatus 11.

A description will now be given of the operations of the information processing apparatus 11 and the storage media supporting apparatus 17.

When the storage media supporting device 17 supporting (housing) the plurality of storage media 15 is attached to the information processing apparatus 11, the storage media 15 supported in the storage media supporting device 17 are electrically connected to the respective connectors provided in the information processing apparatus 11, as described previously with reference to FIGS. 1 and 2. The CPU 41 of the information processing apparatus 11 detects the contents of data stored in the storage media 15, and checks whether or not at least one of the storage media 15 stores system data for activating the RAID system.

The CPU 41 of the information processing apparatus 11 provides control to set the display pattern of the display part 21 provided in the storage media supporting device 17 so as to indicate that the RAID system is set (i.e. there is system data), or the RAID system is not set (i.e. there is no system data). Here, FIG. 3 shows the display pattern which indicates that at least one of the storage media 15 stores system data, and FIG. 4 shows the display pattern which indicates that at least one of the storage media 15 stores no system data.

Specifically, running the stepping motor 25 in accordance with an instruction from the CPU 41 of the information processing apparatus 11 rotates the display part 21 to a predetermined position via the rotor 24 and the dial 22. When the display pattern detector 26 detects the display pattern of the display part 21 at the predetermined position, the stepping motor 25 is stopped.

In this case, the display pattern detector 26 detects the phase, displacement, symbol (identification mark), color, etc. of the display pattern, as well as the shape as in the present embodiment. Also, as mentioned above, the display pattern detector 26 can detect the display pattern of the display part 21 in an arbitrary way e.g. optically, mechanically, or electrically.

When the operator ejects the storage media supporting device 17 from the information processing apparatus 11 in the state in which the display pattern of the display part 21 of the storage media supporting device 17 is set as above, he/she can confirm the setting condition of the RAID system of the storage media supporting device 17 by looking at the display pattern of the display part 21 as described before with reference to FIGS. 3 and 4. Even if there are a plurality of storage media supporting devices 17, it is possible to determine the setting condition of the RAID system of each storage media supporting device 17 by referring to the display pattern of the display part 21. This is very convenient.

Further, when the operator attaches the ejected storage media supporting device 17 to the information processing apparatus 11, the information processing apparatus 11 causes the display pattern detector 26 to detect the display pattern of the display part 21 first. As a result, the CPU 41 of the information processing apparatus 11 confirms the setting condition of the RAID system of the storage media supporting device 17, and checks whether there is system data or not. The CPU 41 selects the way of accessing each of the storage media 15 according to the detection result. Therefore, after the storage media supporting device 41 supporting the plurality of storage media 15 is attached to the information processing apparatus 11, each of the storage media 15 can be inhibited from being suddenly accessed in an improper way, and this ensures security for data stored in the storage media 15.

Further, in the case where the operator replaces a storage medium in the storage media supporting device 17 with another storage medium, the display pattern of the display part 21 can be changed according to e.g. the setting condition of the other storage medium. Specifically, the operator rotates the dial 22 of the storage media supporting device 17 so that the display part 21 connected to the dial 22 is rotated to change the display pattern.

There may be the possibility that the display pattern of the display part 21 is changed due to the operator's error in the state in which the storage media supporting device 17 has been removed from the information processing apparatus 11. In this case, the following measure can be taken, for example.

Figure 8:
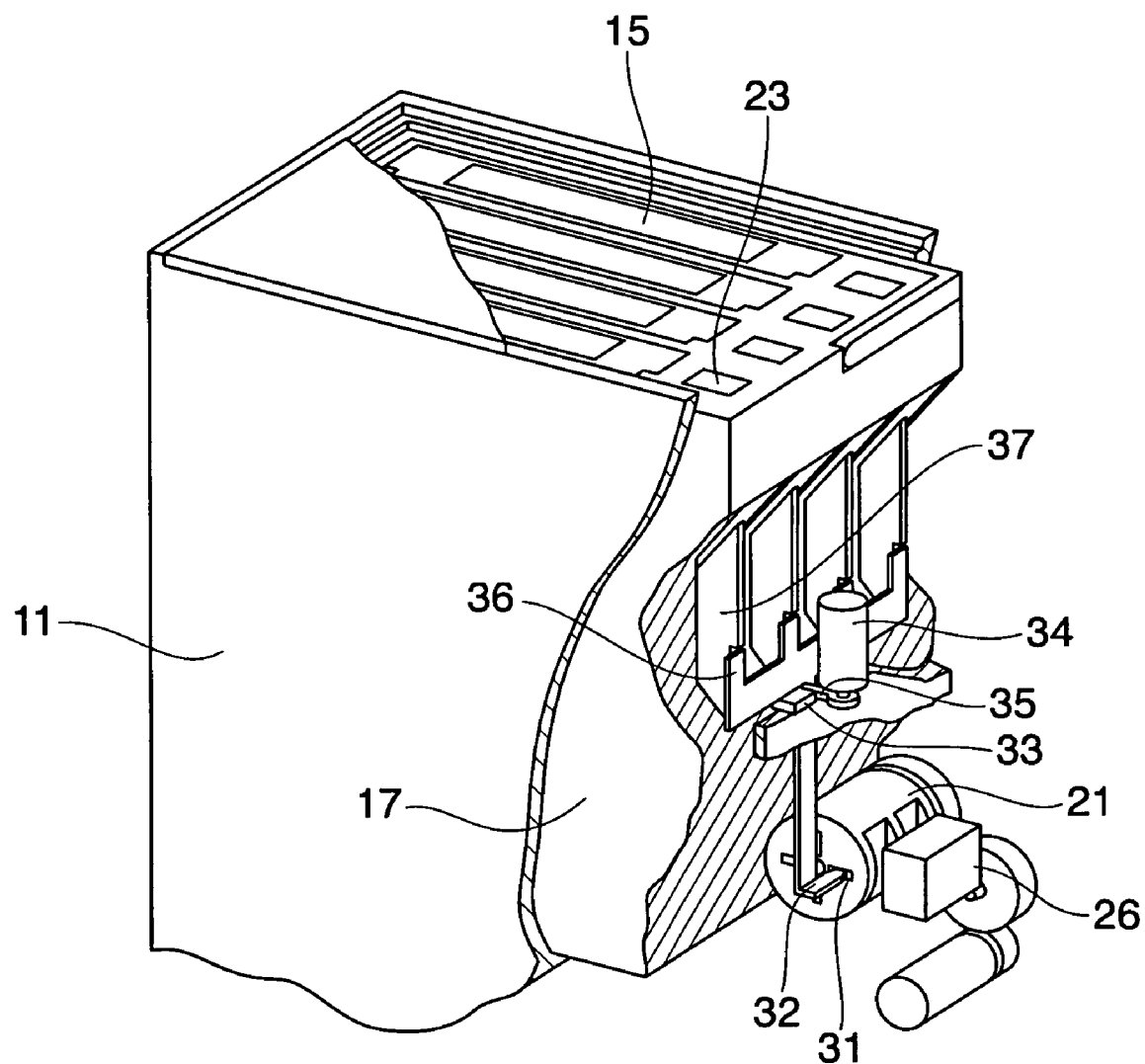
FIG. 8 is a perspective view, partially cutaway, showing the information processing apparatus to which the storage media supporting device according to the first embodiment is attached.
Figure 9:
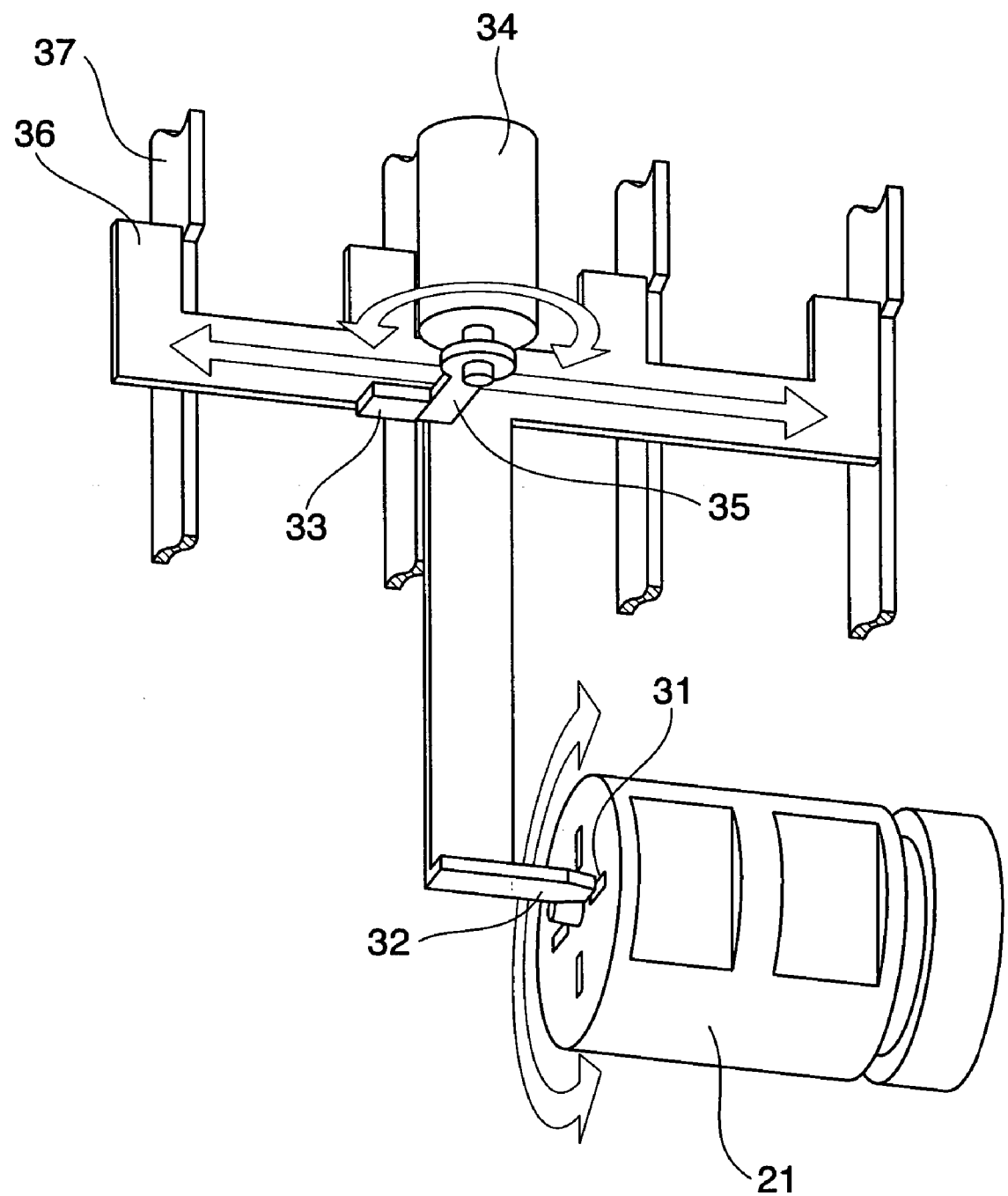
FIG. 9 is a perspective view showing essential parts of the information processing apparatus of FIG. 8.

FIG. 8 is a perspective partially cutaway view showing the information processing apparatus 11 to which the storage media supporting device 17 is attached, and FIG. 9 is a perspective view showing essential parts of the information processing apparatus 11 in FIG. 8. It should be noted that the dial 22, the rotor 24, the display pattern detector 26, and so forth arranged around the display part 21 are identical in construction with those illustrated in FIG. 6.

As shown in FIGS. 8 and 9, display part stop holes 31 are formed in a side surface of the display part 21, and shaped suitably for the phases of the respective display patterns. A lock pin 32 is for stopping the rotation of the display part 21 by engaging with any of the display part stop holes 31. A lock plate 33 provided with the lock pin 32 is disposed within the storage media supporting device 17 such that it can linearly move forward and backward in a horizontal direction as indicated by an arrow in FIG. 9. A lock plate moving motor 34 is disposed within the information processing apparatus 11, for moving the lock plate 33, and is capable of rotating forward and backward.

A lock plate moving lever 35 is connected to the rotary shaft of the lock plate moving motor section 34, and has an end thereof engaged with the lock plate 33 through a gap in a side of the storage media supporting device 17. An eject restricting section 36 is provided on the lock plate 33, and is comprised of restricting parts and non-restricting parts. Eject levers 37 are connected to the respective eject buttons 23, and are formed with cutouts at locations corresponding to the restricting parts of the eject restricting section 36. A description will now be given of the operations of the information processing apparatus 11 and the storage media supporting device 17. Before the storage media supporting device 17 is removed from the information processing apparatus 11, in accordance with an instruction from the operator through the front panel 12 of the information processing apparatus 11, the CPU 41 of the information processing apparatus 11 makes a setting in advance such that the display pattern of the display part 21 can be manually changed or cannot be manually changed in the state in which the storage media supporting device 17 has been removed from the information processing apparatus 11.

If a setting is made such that the display pattern of the display part 21 can be manually changed, the lock plate moving motor 34 rotates forward (clockwise as viewed from the direction of the rotary shaft of the motor 34 in FIG. 9) to move the lock plate 33 via the lock plate moving lever 35. This causes an end of the lock pin 32 to be released from the display part stop hole 31, to allow the display part 21 to rotate, so that the display pattern of the display part 21 can be manually changed. Subsequently, the lock plate moving motor 34 causes the lock plate rotating lever 35 to rotate to a retracted position (a position reached after being rotated 180° from the position indicated in FIG. 9), and therefore, the lock plate moving lever 35 and the storage media supporting device 17 do not interfere with each other when the storage media supporting device 17 is ejected from the information processing apparatus 11.

The movement (leftward as viewed in FIG. 9) of the lock plate 33 on this occasion causes the non-restricting parts of the eject restricting section 36 and the cutouts of the eject levers 37 to face each other, which enables depression of the eject buttons 23. This makes it possible to manually change the display pattern of the display part 21, and to replace the storage media 15 in the storage media supporting device 17.

If a setting is made such that the display pattern of the display part 21 cannot be manually changed, the lock plate moving motor 34 rotates backward (counterclockwise as viewed from the direction of the rotary shaft of the motor 34 in FIG. 9) to move the lock plate 33 in a direction opposite to the direction as mentioned above via the lock plate moving lever 35. This causes the end of the lock pin 32 to engage with the display part stop hole 31, to inhibit rotation of the display part 21. This makes it impossible to manually change the display pattern of the display part 21. Subsequently, the lock plate moving motor 34 causes the lock plate rotating lever 35 to rotate to the retracted position, and therefore, the lock plate moving lever 35 and the storage media supporting device 17 do not interfere with each other when the storage media supporting device 17 is ejected from the information processing apparatus 11.

The movement (rightward as viewed in FIG. 9) of the lock plate 33 on this occasion causes the restricting parts of the eject restricting section 36 and the cutouts of the eject levers 37 to face each other, making it impossible to depress the eject buttons 23. As a result, it is possible to prevent the display pattern of the display part from being changed due to the operator's error, and inhibit replacement of the storage media 15 in the storage media supporting device 17, so that the display pattern of the display part 21 and the corresponding setting state can be kept consistent with each other.

A description will now be given of another example of measures which can be taken to cope with the case where there is the possibility that the display pattern of the display part 21 in the storage media supporting device 17 is changed due to an operator's error.

In ejecting a certain storage medium from the storage media supporting device 17 and replacing it with another storage medium, when the operator depresses a certain eject button 23 of the storage media supporting device 17, the display part 21 rotates in response to the depression of the eject button 23, so that a different display pattern (which indicates that at least one storage medium has been ejected) from the display patterns shown in FIGS. 3 and 4 is displayed. The information processing apparatus 11 may be configured such that, if the storage media supporting device 17 set to this display pattern is subsequently attached to the information processing apparatus 11, default processing is started with checking whether or not there is system data in storage media within the storage media supporting device 17 according to the display pattern detected by the display pattern detector 26. Therefore, it is possible to cope with the case where there is the possibility that the display pattern of the display part is changed due to an operator's error.

According to the present embodiment described above, various effects as described below can be obtained.

Since the display pattern of the display part 21 which is provided in the storage media supporting device 17 attached to the information processing apparatus 11 and is disposed to be viewed from outside is set to a state corresponding to detected contents of data stored in storage media within the storage media supporting device 17 (if system data for activating the RAID system is stored in at least one of the plurality of storage media, the display pattern is set to indicate the presence of the system data), the information processing apparatus 11 can show display patterns of the display part 21 to e.g. identify a combination of a plurality of storage media within the storage media supporting device 17 (for example, whether a plurality of storage media are a combination of RAID systems, and whether data stored in storage media are data created by another OS), or indicate that data stored in storage media have been changed to other data (for example, an OS is replaced, and new data is stored in storage media), and the display patterns can be confirmed from the outside of the information processing apparatus 11. Therefore, it is possible to accurately manage a plurality of storage media realized by cooperation with each other, and manage data for each OS.

Further, since the way of accessing storage media within the storage media supporting device 17 is selected according to the display pattern of the display part 21 of the storage media supporting device 17, which is detected by the display pattern detector 26 of the information processing apparatus 11, it is possible to prevent the information processing apparatus 11 from suddenly accessing storage media within the storage media supporting device 17 in an improper way, and this ensures security for data stored in the storage media.

Further, the display pattern of the display part 21 in the storage media supporting device 17 is set in association with data stored in a single storage medium or a plurality of storage media stored and managed outside the information processing apparatus 11 or a combination of storage media, and when the storage medium supporting device 17 supporting the single storage medium or the plurality of storage media is attached to the information processing apparatus 11, the information processing apparatus 11 detects the display pattern of the display part 21 in the storage media supporting device 17. Therefore, the information processing apparatus 11 can prepare in advance a starting process (in which the information processing apparatus 11 is started, and data is written to/read from storage media) suitable for data stored in storage media within the storage media supporting device 17, and quickly start writing/reading data to/from the storage media.

Further, since whether or not the display pattern of the display part 21 is to be manually changeable in the state in which the storage media supporting device 17 has been removed from the information processing apparatus 11 can be set through operation of the information processing apparatus 11, there is no risk that a combination of storage media or a single storage medium stored and managed outside the information processing apparatus 11 after the data is stored in the information processing apparatus 11 is stored in the storage media supporting device 17, and then the storage media supporting device 17 is attached to another information processing apparatus to change data.

Further, even in the case where data is changed outside the information processing apparatus, i.e. in the case where data stored in a storage medium is copied to another storage medium, or the storage medium is replaced with another storage medium, due to the expiration date of the storage media stored and managed outside the information processing apparatus or the like, the storage media are stored and managed in association with the change in the data, and therefore the display pattern of the display part 21 in the storage media supporting device 17 can be manually changed outside the information processing apparatus 11.

Further, in the case where it is configured such that the display pattern of the display part 21 in the storage media supporting device 17 cannot be manually changed in the state in which the storage media supporting device 17 has been removed from the information processing apparatus 11, storage media are inhibited from being singly ejected from the storage medium supporting device 17, and therefore the display pattern of the display part 21 and the corresponding setting condition can be kept consistent with each other.

Further, when a storage medium is singly ejected from the storage media supporting device 17 attached to the information processing apparatus 11, the display part 21 of the storage media supporting device 17 indicates the ejection of at least one storage medium from the storage media supporting device 17 by its display pattern, and therefore it is possible to cope with the case where there is the possibility that the display pattern of the display part 21 is changed due to an operator's error.

Although in the present embodiment, the display pattern of the display part 21 disposed in the storage media supporting device 17 is rectangular as shown in FIGS. 3 and 4, this is not limitative, but the display pattern may be arbitrarily shaped (e.g. circular). Further, the display pattern may be represented by a symbol such as a mark, as well as by color. Further, although in the present embodiment, the display part 21 is cylindrical, this is not limitative, but the display part 21 may be arbitrarily shaped (e.g. triangle pole-shaped or square pole-shaped).

Further, although in the present embodiment, the storage media supporting device 17 is attached and removed to and from the information processing apparatus 11 from the upper surface of the housing, this is not limitative, but for example, the storage media supporting device 17 may be attached and removed to and from the information processing apparatus 11 from a surface opposite to the surface where the front panel 12 is disposed. In this case, the opening 14 with the outer cover 13 at the top of the housing should be provided for replacement of storage media in the storage media supporting device 17.

Further, in the present embodiment, the display pattern of the display part 21 disposed in the storage media supporting device 17 attached to the information processing apparatus 11, which is detected by the display pattern detector 26, may be displayed in the front panel 12 of the information processing apparatus 11.

A description will now be given of a storage media supporting device according to a second embodiment of the present invention.

Figure 10:
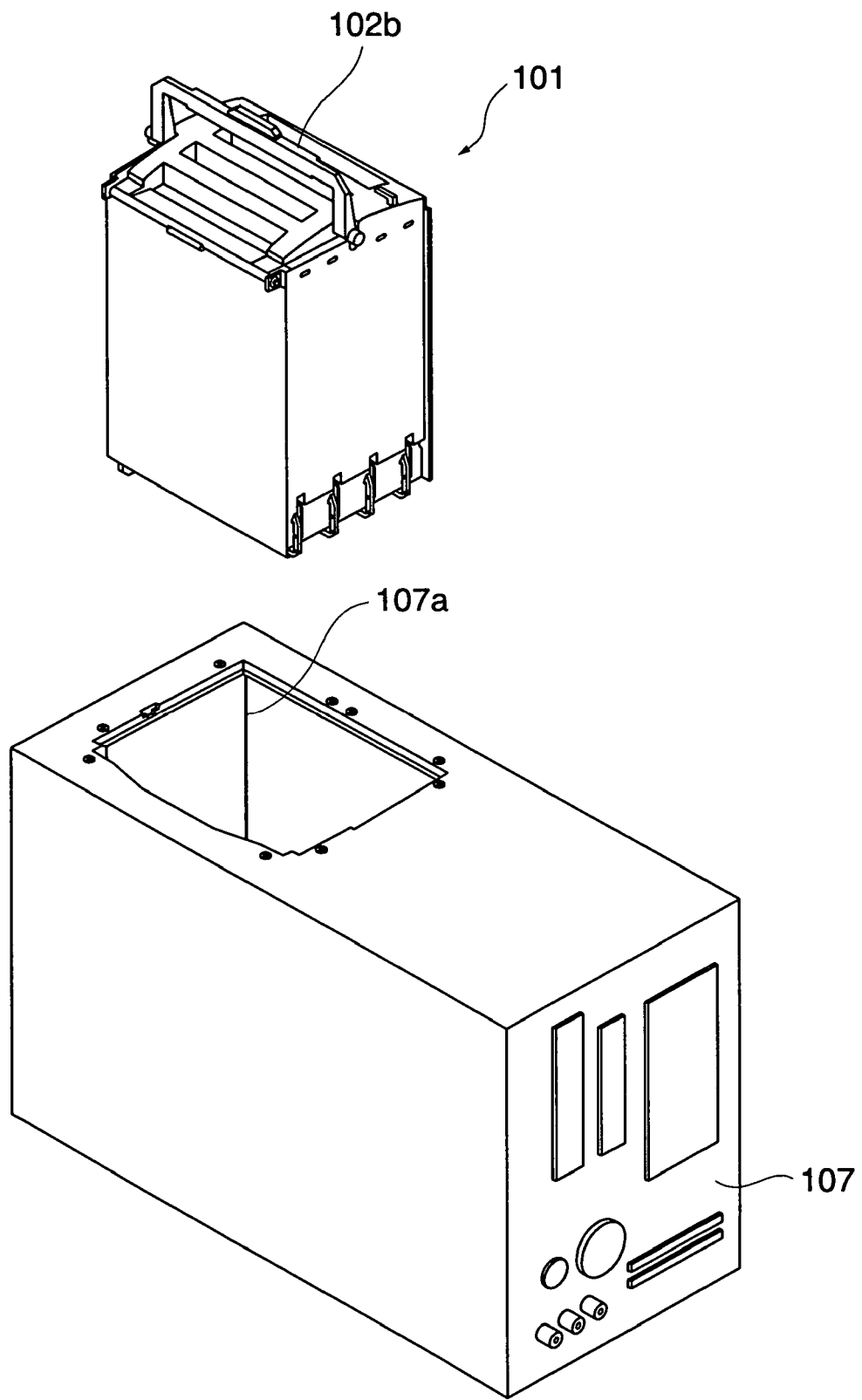
FIG. 10 is a view showing a state in which a removable unit as a storage media supporting device according to a second embodiment of the present invention is attached to/removed from an information processing apparatus.
Figure 11:
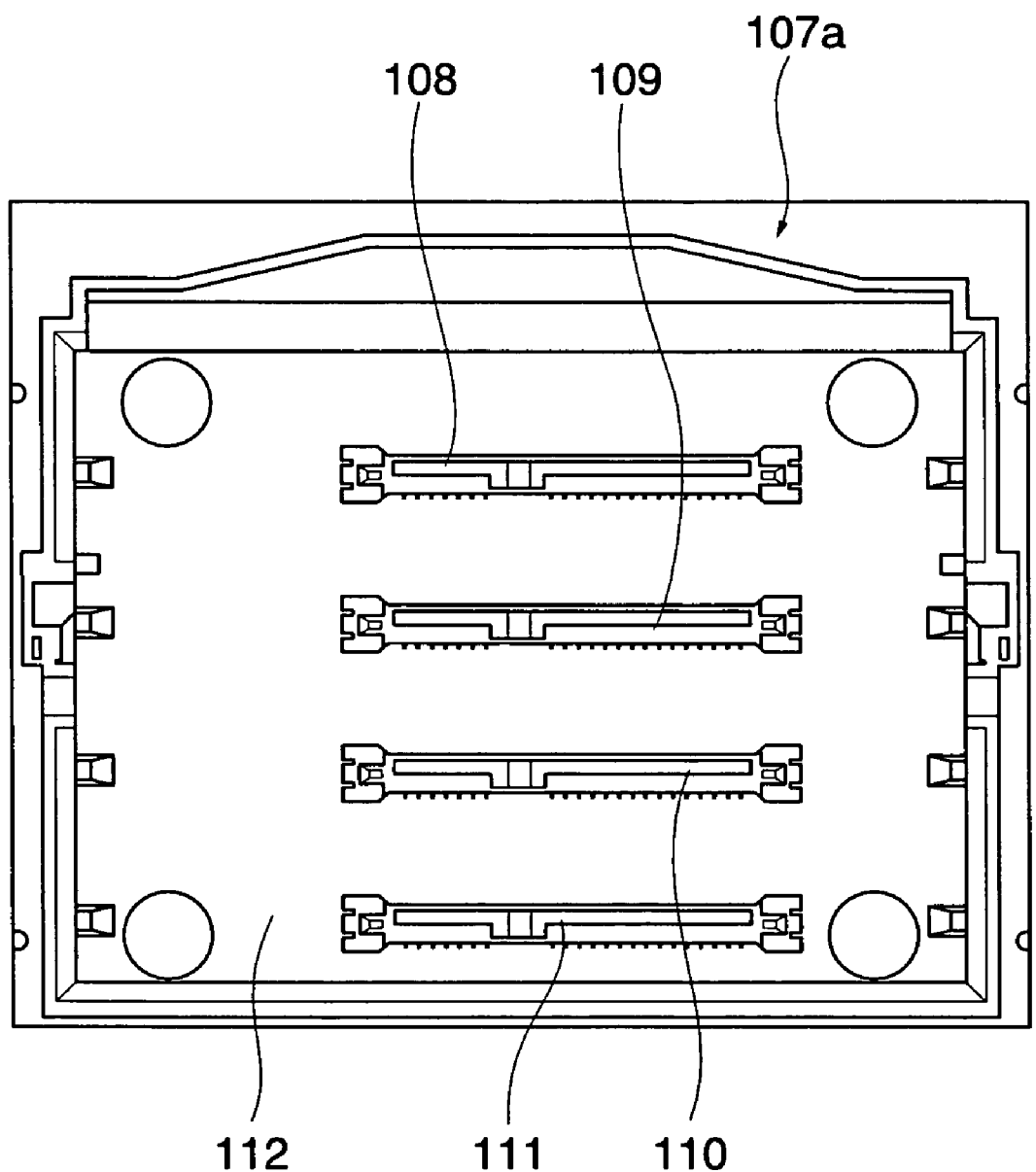
FIG. 11 is a view showing the internal construction of an attachment/removal section appearing in FIG. 10.
Figure 12:
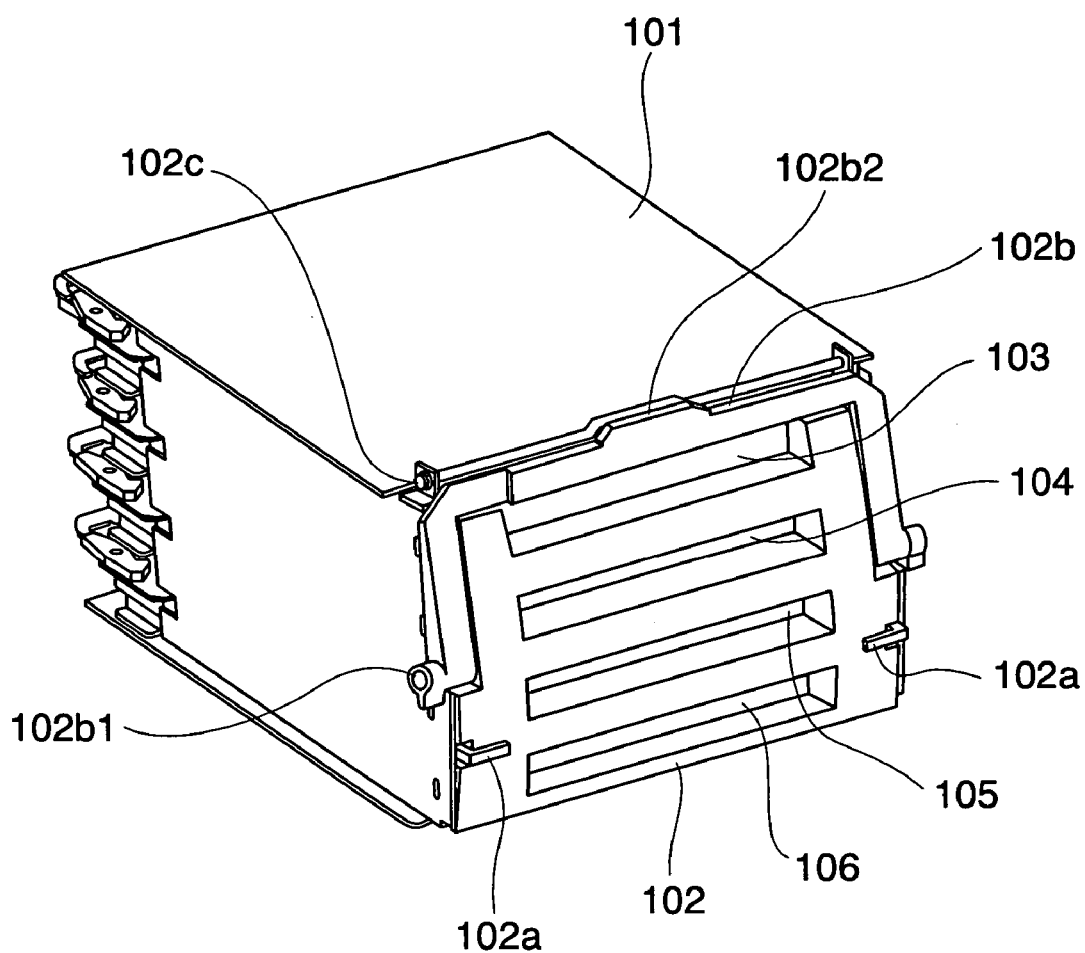
FIG. 12 is a perspective view showing the removable unit in FIG. 10 and storage media housed in the removable unit.
Figure 13:
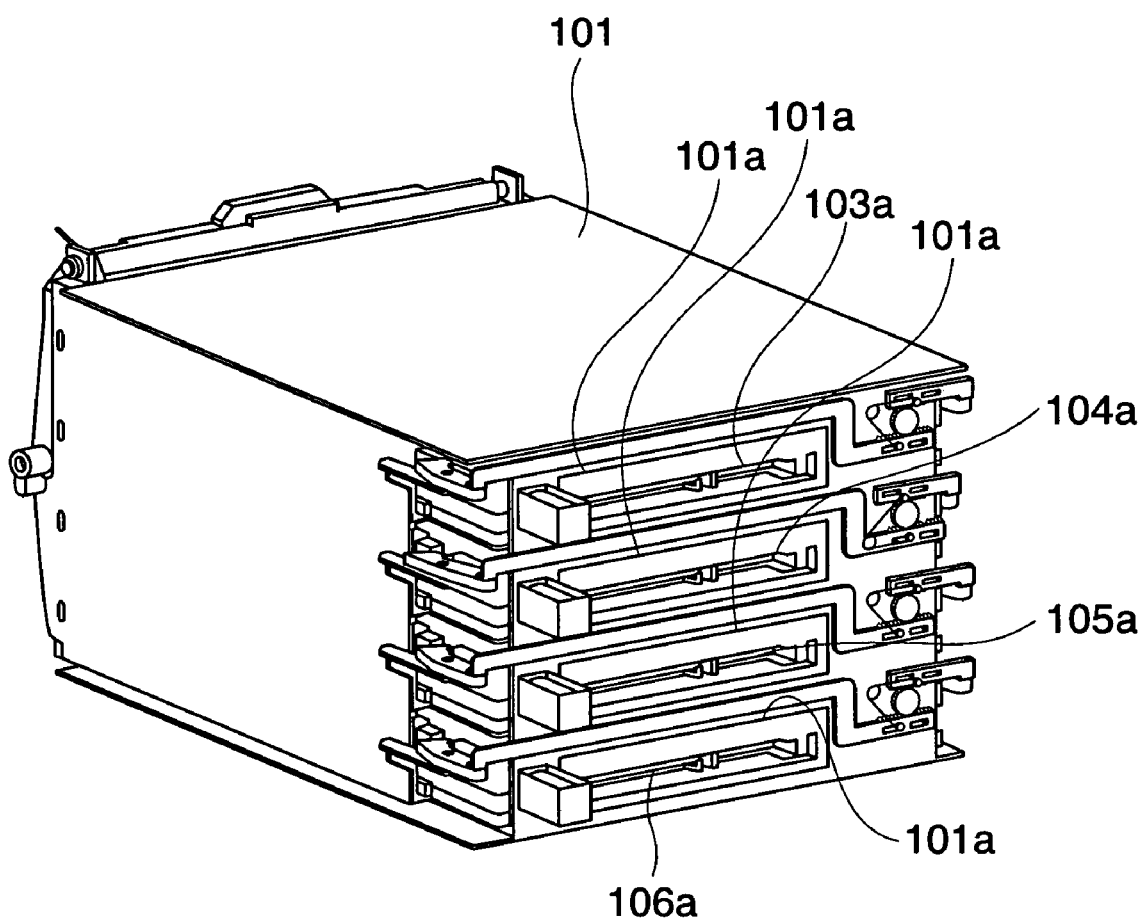
FIG. 13 is a perspective view showing connectors for connecting the housed storage medium to the information processing apparatus.

FIG. 10 is a view showing a state in which a removable unit 101 as the storage media supporting device according to the present embodiment is attached to/removed from an information processing apparatus 107. FIG. 11 is a view showing the internal construction of an attachment/removal section 107a, FIG. 12 is a perspective view showing the removable unit 101 and storage media housed in the removable unit 101, and FIG. 13 is a perspective view showing connectors for connecting the housed storage medium to the information processing apparatus 107.

As shown in FIGS. 10 to 13, the information processing apparatus 107 is provided with the attachment/removal section 107a for attachment of the removable unit 101, which can be removably attached to the attachment/removal section 107a. In attaching/removing the removable unit 101, inner surfaces of the attachment/removal section 107a, which are in contact with the removable unit 101, guide the outer periphery of the removal unit 101 so that the removable unit can be placed at a predetermined location of the information processing apparatus 107. A substrate 112 is provided at the bottom of the attachment/removal section 107a in a fashion being opposed to the removable unit 101 attached to the information processing apparatus 107, and receptacle connectors 108 to 111 are mounted on the surface of the substrate 112.

The removable unit 101 is also provided with a grip section 102b so as to be carried by hand and easily attached and removed. The grip section 102b includes a holding section 102b2, which is rotated substantially 90° about a rotation center 102b1 and in such a direction as to get the holding section 102b2 away from the removable unit 101, so that the grip section 102b can be gripped. The operator holds the holding section 102b2 of the grip section 102b to hold the removable unit 101, and attaches/removes it to/from the information processing apparatus 107.

Four storage media 103 to 106 are housed in the removable unit 101. The storage media 103 to 106 are mounted in the information processing apparatus 107 via the removable unit 101, and cooperate with each other to constitute a RAID system which records data. Four openings 101a are formed in a surface of the removable unit 101, which is opposed to the grip section 102b, and connectors 103a to 106a for external connection, which are exclusively provided on the respective storage media 103 to 106, are exposed from the openings 101a. When the removable unit 101 housing the storage media 103 to 106 therein is attached to the attachment/removal section 107a, the connectors 103a to 106a are engaged with and electrically connected to the respective receptacle connectors 108 to 111 provided in the information processing apparatus 107. The storage media 103 to 106 within the removable unit 101 are guided to be positioned within respective predetermined positional ranges by surfaces of a housing section 100 (refer to FIG. 14), described later, of the removable unit 101, which surfaces are in contact with the storage media 103 to 106. Also, the removable unit 101 is guided to be positioned within a predetermined positional range in the attachment/removal section 107a. Therefore, the connectors 103a to 106a of the respective storage media 103 to 106 housed in the attachment/removal section 101 can be accurately engaged with the respective receptacle connectors 108 to 111.

Flexible cables, not shown, for connecting the receptacle connectors 108 to 111 to a main substrate, not shown, of the information processing apparatus 107 are mounted on a surface of the substrate 112, which is opposite to the surface where the receptacle connectors 108 to 111 are provided. When the removable unit 101 is attached to the attachment/removal section 107a, the connectors 103a to 106a for external connection, the receptacle connectors 108 to 111, and the flexible cables are brought into conduction with each other to form an electric connection path. The information processing apparatus 107 carries out recording and reproducing operations such as data readout and writing through this path. In this way, the removable unit 101 is attached to the attachment/removal section 107a, making it possible to access the storage media 103 to 106 housed in the removable unit 101.

Further, the removable unit 101 is provided with a cover 102 for inhibiting the storage medium 103 to 106 from being displaced in such a direction as to be ejected. The cover 102 is supported on the removable unit 101 such that it can rotate about a rotation center 102c. When the removable unit 101 is used in the state attached to the information processing apparatus 107 as usual, the cover 102 is closed. The cover 102 is opened for replacement of the storage media 103 to 106. Further, the cover 102 is normally urged in such a direction as to be opened; when right and left unlock levers 102a are turned aside, the cover 102 is opened, and when the opened cover 102 is closed into a predetermined position, the cover 102 is automatically inhibited from being opened, so that the cover 102 can be kept closed until the unlock levers 102a are turned aside again.

A description will now be given of how the storage media 103 to 106 are housed in the removable unit 101.

Figure 14:
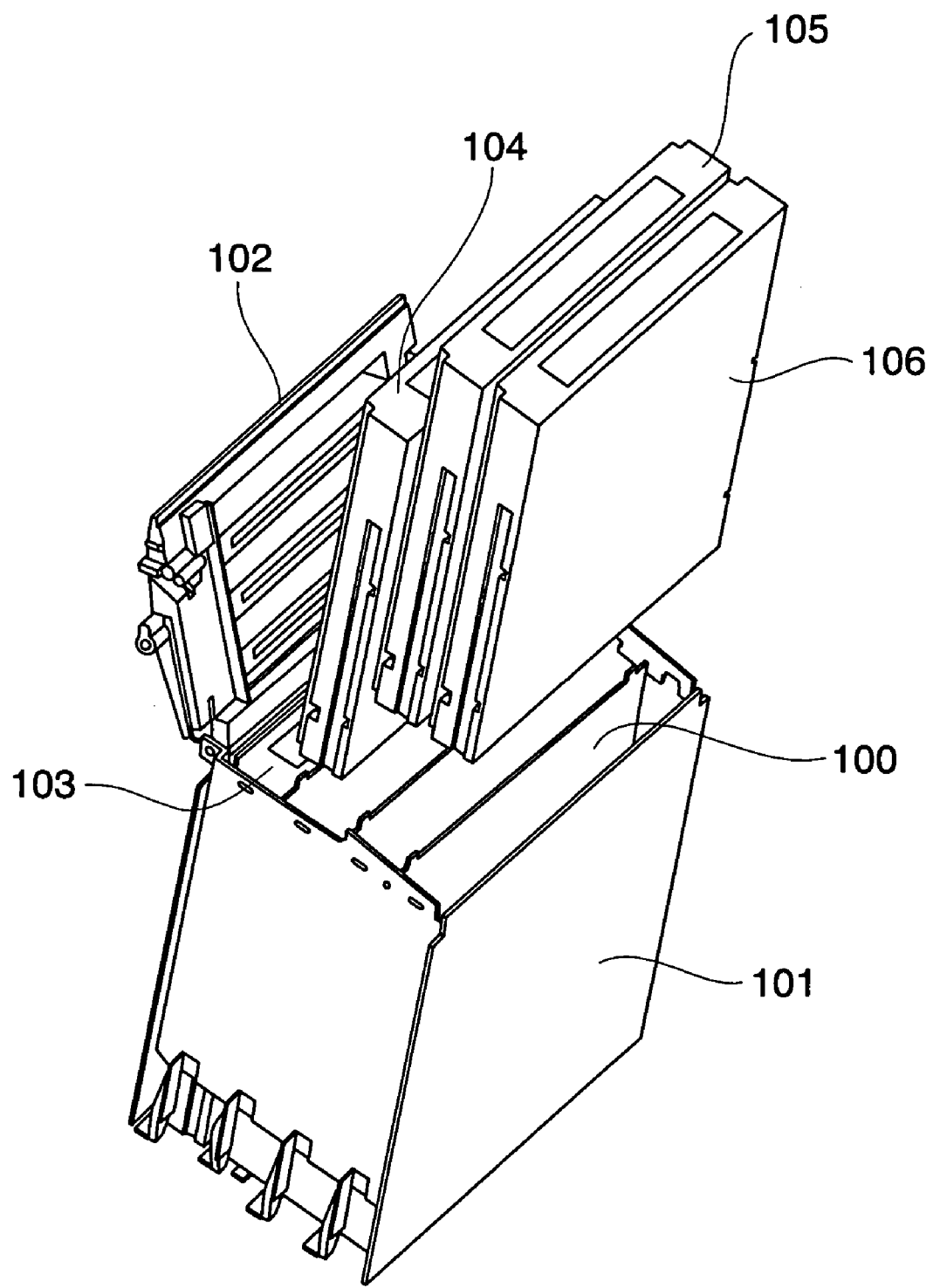
FIG. 14 is a view showing a state in which a cover for the removable unit appearing in FIG. 12 is opened to house the storage media in housing sections of the removable unit.

FIG. 14 is a view showing a state in which the cover 102 is opened, and the storage media 103 to 106 are housed in the housing section 100 of the removable unit 101. As shown in FIG. 14, when the cover 102 is opened, the housing section 100 is exposed. The housing section 100 is comprised of four housing places where the respective storage media 103 to 106 are housed. When the cover 102 is closed after the storage media 103 to 106 are housed to be in the position of the storage medium 103 shown in FIG. 12, the cover 102 urges rear edges of the storage media 103 to 106, so that the storage media 103 to 106 are moved to respective predetermined positions. Then, if the cover 102 comes into a predetermined position, the cover 102 is locked to completely house the storage media 103 to 106.

A description will now be given of a defect detecting method. Here, it is assumed that the storage media are hard disks.

Figure 19:
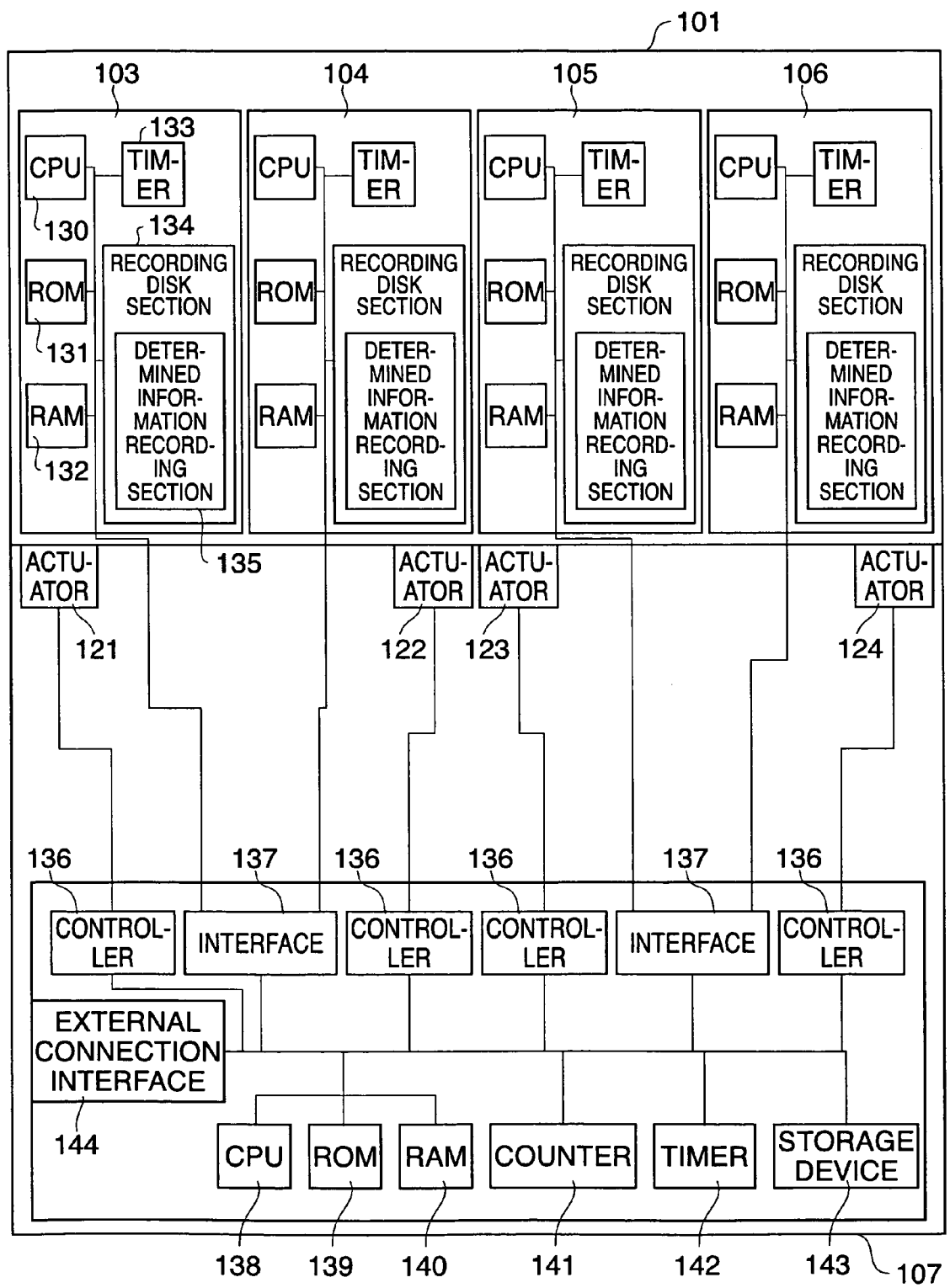
FIG. 19 is a block diagram showing control functional blocks of the information processing apparatus in FIG. 10 and the storage media housed in the removable unit.

FIG. 19 is a block diagram showing control functional blocks of the information processing apparatus 107 and the storage media 103 to 106 housed in the removable unit 101. It should be noted that in the following description, the storage medium 103 is regarded as a representative of the four storage media 103 to 106.

The information processing apparatus 107 and the storage media 103 to 106 housed in the removable unit 101 are connected to each other via an interface 137 to constitute a RAID system. As shown in FIG. 19, the information processing apparatus 107 is comprised of a CPU 138, a RAM 140, a ROM 139, a storage device 143 comprised of a RAM with a backup power source, an external connection interface 144 for connection to external peripheral devices, a plurality of interfaces 137 which are each comprised of an LSI and are connected to the storage media 103 to 106, a timer 142, a counter 141, a controller 136 for driving actuators 121 to 124, and the actuators 121 to 124.

The ROM 139 stores control programs, in accordance with which the CPU 138 controls the overall operation of the information processing apparatus 107 such as access to the storage medium 103. The RAM 140 serves as a work area for operation of the CPU 138. The CPU 138 also controls the storage medium 103 and the actuators 121 to 124.

On the other hand, the storage medium 103 is comprised of a CPU 130, a ROM 131, a RAM 132, a recording disk section 134 including a magnetic disk and a determined information recording section 135 which records information determined by the CPU 130, and a timer 133. In accordance with the result of determination by the CPU 130, the determined information recording section 135 accumulatively stores the number of times an error has occurred, and accumulatively stores an operative time period each time the storage medium 103 is operated. The ROM 103 stores control programs, in accordance with which the CPU 130 controls the storage medium 103. The RAM 132 serves as a work area for operation of the CPU 130. The RAID system according to the present embodiment is constructed as described above.

A description will now be given of failures in the storage medium 103, which are detected by the information processing apparatus 107.

First, "failure" means a state in which the number of times data is read out from and/or written into a hard disk has exceeded a predetermined number of times; e.g. a state in which data has been broken due to a scratch on the surface of a hard disk or the like, or a state in which it is impossible to access a hard disk due to a failure in one or more electric parts within the hard disk. In this case, the storage medium 103 cannot output failure information to the information processing apparatus 107, and hence detection of such a failure is carried out in the information processing apparatus 107. The CPU 138 accesses the storage medium 103 a predetermined number of times, causes the counter 141 to count the number of times data has not been successfully read or written, and accumulatively stores the counted number of times in the storage device 143. It is configured such that the counted number of times is monitored each time the storage medium is accessed, and when the counted number of times exceeds a predetermined number of times, it is determined that the storage medium 103 has failed. Also, the timer 142 measures a period of time elapsed before a response is returned after the CPU 138 gives an instruction for accessing the storage medium 103. If there is no response within a predetermined period of time, i.e. when time out, it is determined that the storage medium 103 has failed.

Secondly, even if data can be read and written though incompletely, it is determined that the storage medium 103 has failed when the operative status of each hard disk device or the status of a hard disk satisfies predetermined conditions regarding predetermined determination items; e.g. when data reading/writing errors have occurred with a higher frequency than a predetermined level, the number of defective sectors where reading/wiring is impossible has reached a predetermined number of times, or the accumulative operation time period has exceeded a predetermined period of time. In this case, the storage medium 103 can output failure information to the information processing apparatus 107, and hence detection of such a failure is carried out in the storage medium 103, and information on the failure is transmitted to the information processing apparatus 107. Specifically, the timer 133 measures a certain period of time, and the CPU 130 accesses the determined information recording section 135 at time intervals corresponding to the measured period of time, so that the number of times an error has occurred, the number of defective sectors, and the operation time period are accumulatively stored in the determined information recording section 135. At the same time, each time the CPU 130 accesses the determined information recording section 135, it is checked whether any of the following conditions A to C is satisfied or not, and if any of the conditions A to C is satisfied, failure information is output to the information processing apparatus 107, and the CPU 138 determines that the storage medium 103 has failed:

A. the number of defective sectors is equal to or greater than L;

B. the number of times read/write errors have occurred is equal to or greater than M; and C. the accumulative operation time period is equal to or greater than N, (L, N, and M are arbitrary positive integers).

In accordance with the received failure information, the information processing apparatus 107 drives the actuators 121 to 124, described later (refer to FIG. 17).

A description will now be given of a process for operating a restricting/releasing mechanism of the information processing apparatus 107, and releasing e.g. the storage medium 103 within the removable unit 101 so as to enable displacement thereof.

Figure 15:
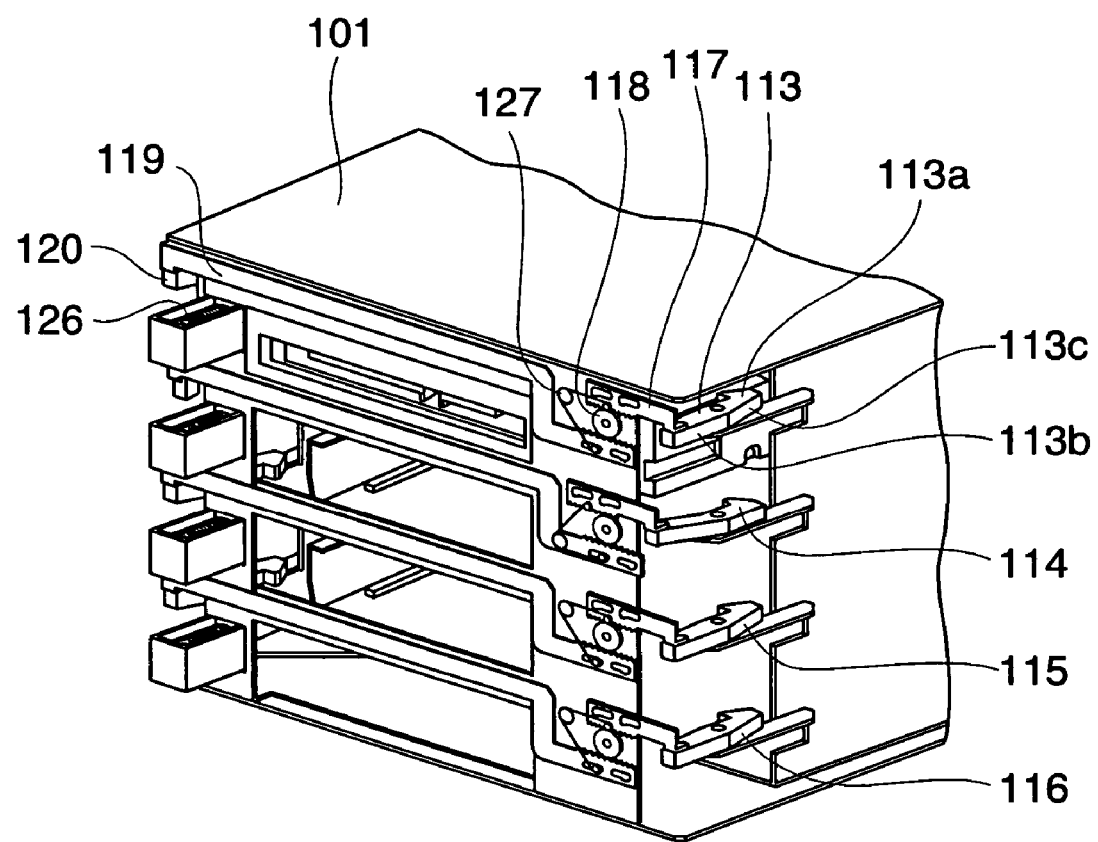
FIG. 15 is a perspective view, partially broken away, showing a lock/release mechanism of the removable unit according to the second embodiment.
Figure 16:
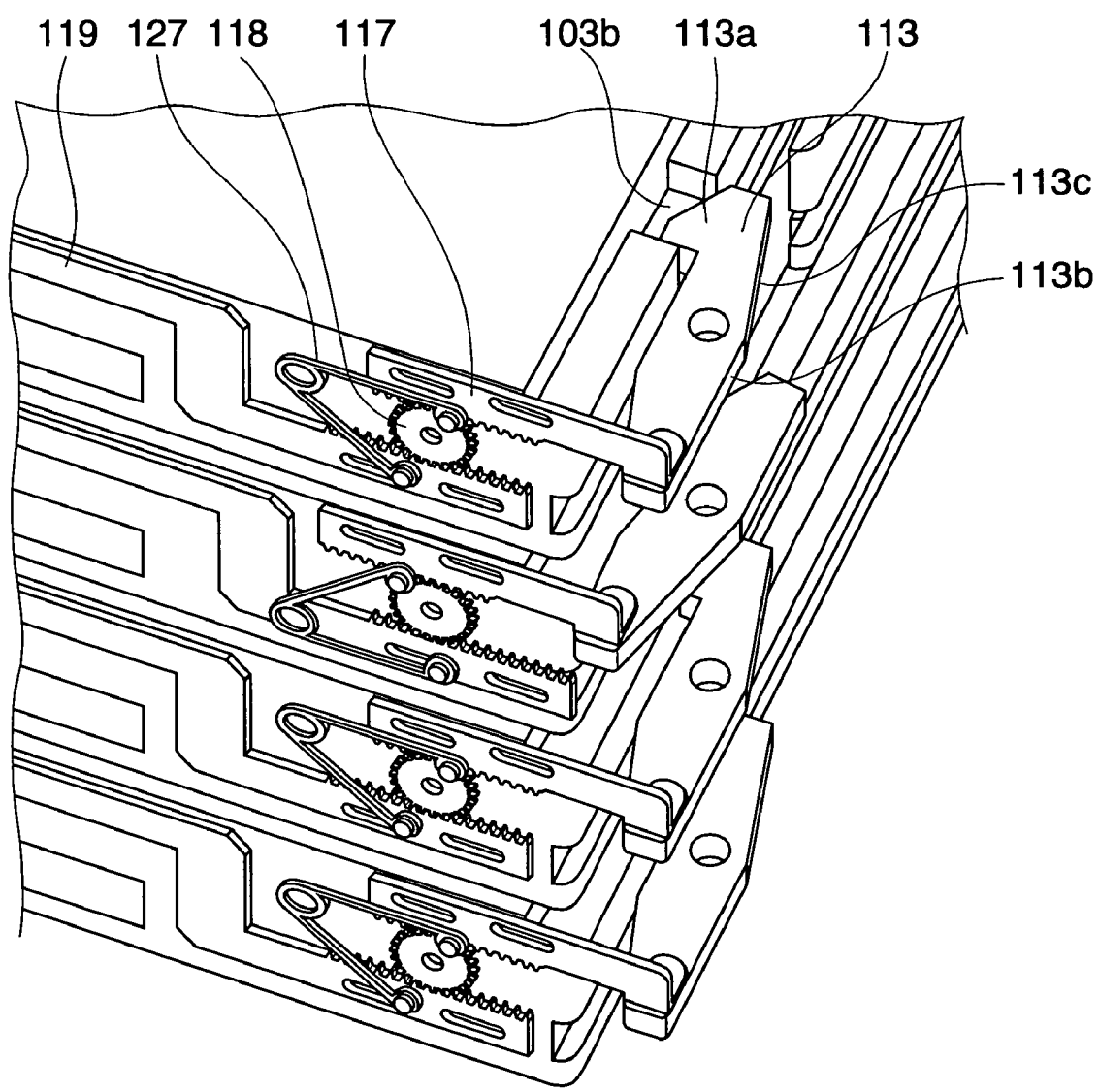
FIG. 16 is a fragmentary perspective view showing, on an enlarged scale, the lock/release mechanism and an urging mechanism appearing in FIG. 15.

FIG. 15 is a partially broken-away view showing the restricting/releasing mechanism of the removable unit 101, and FIG. 16 is an enlarged view showing the restricting/releasing mechanism and an urging mechanism appearing in FIG. 15.

In FIGS. 15 and 16, a lock member 113 is rotatably supported by a shaft fixed to a housing for the removable unit 101. An end of the lock member 113 is provided with a restricting part 113a which is engaged in a groove 103b of the storage medium 103 to inhibit displacement of the storage medium 103. In the example shown in FIG. 15, the lock member 113 lies in such a position as to restrict the displacement of the storage medium 113, and when the restricting part 113a rotates in a direction away from the storage medium 113 to enable displacement of the storage medium 113, the lock member 113 is positioned like a lock member 114. The storage media 103 to 106 are normally housed in the unlocked state.

The lock member 113 is supported by a connecting rod 117 which moves in response to the movement of the lock member 113. The connecting rod 117 is supported such that it is guided by two pins fixed to the housing for the removable unit 101 to move linearly from side to side. A part of the connecting rod 117 is formed with a rack engaged with a pinion 118, which is rotatably supported by a shaft fixed to the housing for the removable unit 101. The pinion 118 rotates in response to the movement of the connecting rod 117. Also, the pinion 118 is guided by two pins fixed to the housing for the removable unit 101, and is engaged with a rack formed on a part of a connecting rod 119 so as to move the connecting rod 119. As is the case with the lock member 113, a lock member 120 which restricts the displacement of the storage medium 103 is supported by the connecting rod 119 such that it moves in response to the movement of the connecting rod 119. The lock member 113 and the lock member 120 move in unison with each other. Therefore, when one of the connecting rods 117 and 119 restricts the displacement of the storage medium 103, the other one of them restricts the displacement of the storage medium 103, too, and similarly, when one of the connecting rods 117 and 119 does not restrict the displacement of the storage medium 103, the other one of them does not restrict the displacement of the storage medium 103, either. An inversion spring 127 having two stable states is engaged with the connecting rods 117 and 119, and is selectively stopped in a restricted state (the first stable state), and an unrestricted state (the second stable state) in response to the movement of the connecting rods 117 and 119. When the inversion spring 127 lies in the first or second stable state, the connecting rods 117 and 119 and the mechanism moving in response to their movements maintain their current positions.

To release the storage medium 103 by applying an external force thereto, a surface 113b of the lock member 113, for example, is urged to rotate the lock member 113 until the inversion spring 127 comes into the first stable state. Conversely, to restrict the displacement of the storage medium 103, a surface 113c of the lock member 113 is urged to rotate the lock member 113 until the inversion spring 127 comes into the second stable state.

Further, as shown in FIG. 15, the removable unit 101 is provided with compression springs 126 each of which urges the storage medium 103 in the ejecting direction. When the storage medium 103 is housed, the compression spring 126 is compressed, and the resulting reactive force is applied to the storage medium 103. In this state, if the storage medium 103 is held and the lock member 113 is operated, the lock member 113 restricts the displacement of the storage medium 103, and the compression spring 126 remains compressed, so that the reactive force remains applied to the storage medium 103. Therefore, if the storage medium 103 is released from its state locked by the lock member 113 while the cover 102 is opened, the storage medium 103 is pushed out in the ejecting direction. The removable unit 101 is also provided with like restricting/releasing mechanisms such as lock members and mechanisms for urging the storage media 103 by compression springs in housing locations where the other storage media 104 to 106 are housed.

In this way, the lock member 113 as well as the cover 102 restricts the displacement of the storage medium 103 in the ejecting direction.

A description will now be given of how the information processing apparatus 107 releases the storage medium 103 to enable displacement thereof.

Figure 17:
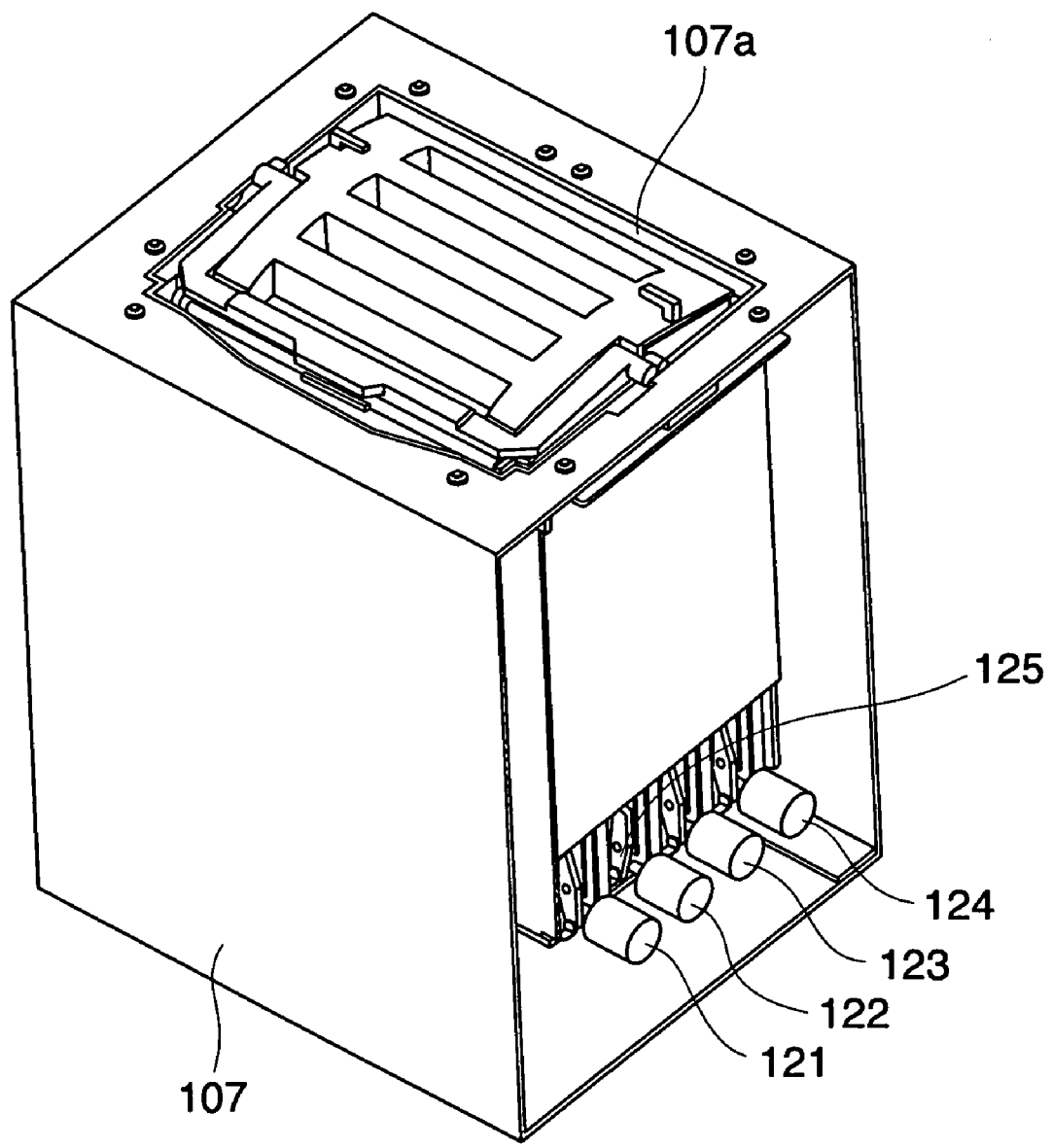
FIG. 17 is a perspective view, partially broken away, showing the removable unit according to the second embodiment attached to the information processing apparatus, and the interior of the information processing apparatus.

FIG. 17 is a partially broken-away perspective view showing the removal unit 101 attached to the information processing apparatus 107 and the interior of the information processing apparatus 107.

Among the actuators 121 to 124 such as motors and plungers, the actuator 121 is disposed and fixed at such a position as to urge the surface 113b of the lock member 113 (refer to FIG. 15) intended for releasing, so that when the actuator 121 is driven, the surface 113 can be urged. As described above, when the information processing apparatus 107 detects a defective storage medium, an actuator located at a position corresponding to the detected storage medium is selectively driven to cause the lock members 113 and 120 constituting the mechanism for locking and releasing a defective storage medium from the groove 103b and a like groove of the storage medium 103, so that the storage medium 103 is released. FIG. 17 shows a state in which the actuator 122 has been driven to release the lock member 114.

A description will now be given of a state in which the removable unit 101 in the state shown in FIG. 17 has been ejected.

Figure 18:
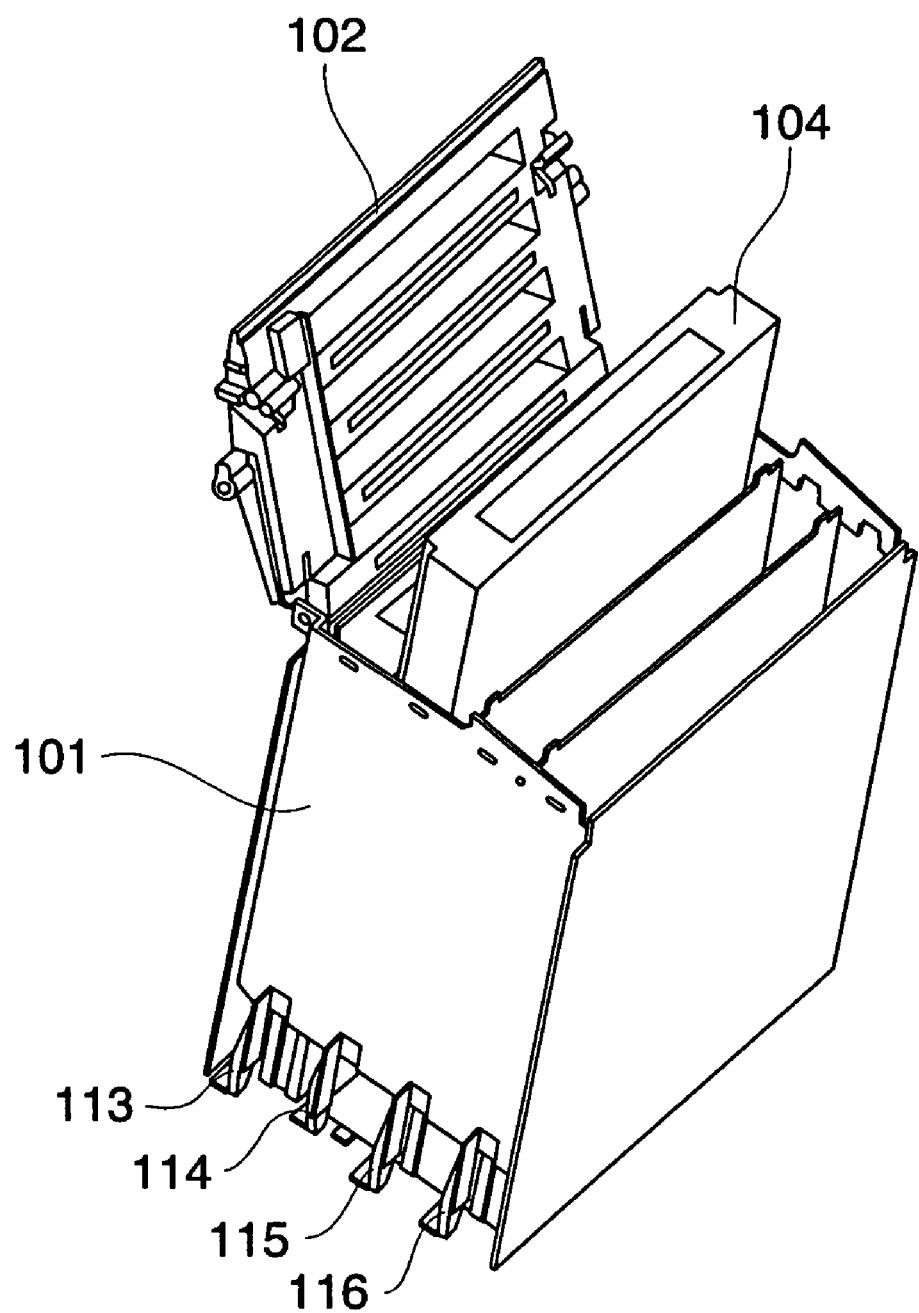
FIG. 18 is a perspective view showing a state in which the removable unit according to the second embodiment is removed from the main body of the information processing apparatus, and the cover for the removable unit is opened.

FIG. 18 is a view showing a state in which the removable unit 101 has been ejected from the information processing apparatus 107, and the cover 102 has been opened.

With the defective storage medium 104 being released, when the removable unit 101 is ejected from the information processing apparatus 107, and the cover 102 is opened, the displacement of the defective storage medium 104 is derestricted, and the above-mentioned compression spring pushes out only the defective storage medium 104.

Since only the defective storage medium 104 is pushed out in the ejecting direction as above, it is possible to reliably identify the defective storage medium 104, and hold and replace the defective storage medium 104, which realizes a high operability. Further, it goes without saying that even if the removable unit 101 is attached to the information processing apparatus 107, it is possible to identify and replace the defective storage medium 104 by the above described method insofar as the cover 102 is allowed to be opened.

Figure 20A:
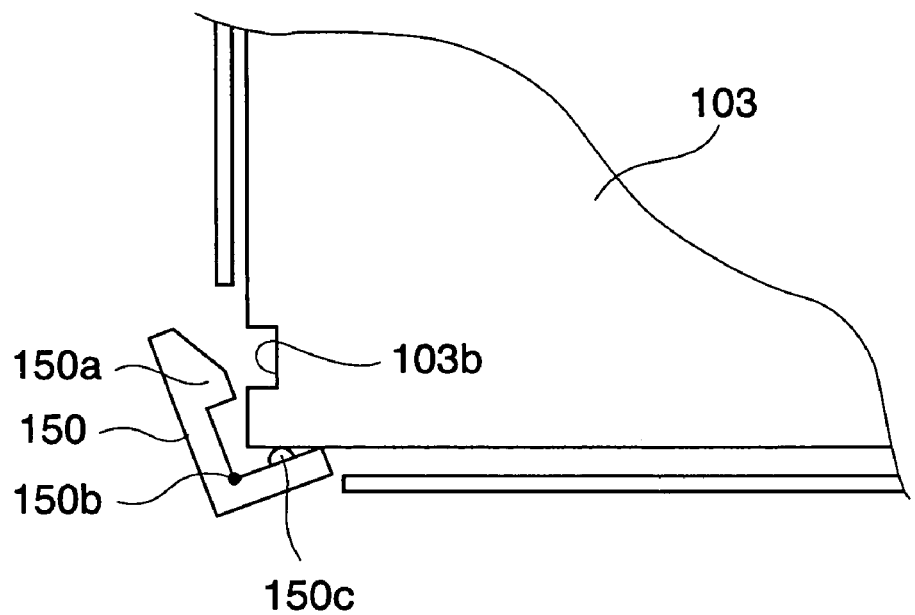
FIGS. 20A and 20B are partially broken-away views showing another example of a lock member appearing in FIG. 16.
Figure 20B:
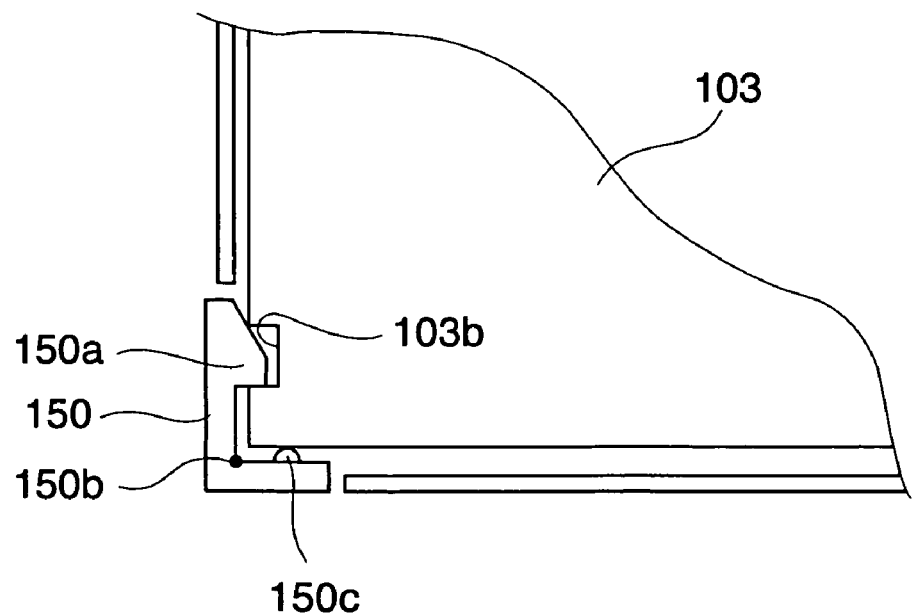

FIGS. 20A and 20B are partially broken-away views showing a variation of the lock member 113 described with reference to FIG. 16.

A lock member 150 has substantially the same function as that of the lock member 113. The lock member 150 differs from the lock member 113 in that there is provided a part to be urged 150c. As shown in FIG. 20A, when the storage medium 103 becomes closer to the part to be urged 150c, the front face of the storage medium 103 urges the part to be urged 150c, so that the lock member 150 rotates about a rotation center 150b. As a result, a restricting part 150a fits into the groove 103b to lock the storage medium 103 as shown in FIG. 20B.

In this way, the front face of the storage medium 103 urges the part to be urged 150c to lock the storage medium 103.

In this way, the lock member 150 is stably kept in this state, so that the storage medium 103 can be kept locked insofar as the lock member 150 does not rotate.

As described above, according to the present embodiment, since a defective storage medium is displaced in the removable unit ejecting direction and is clearly specified, it is possible to reliably identify the defective storage medium without the need to supply electric power to the removable unit and without relying on the memory of the location of the defective storage medium indicated by the display part. This eliminates the possibility that a storage medium with no defects is ejected by mistake. Further, since a defective storage medium is pushed out in the ejecting direction, it is much easier to replace the defective storage medium.

A description will now be given of a storage media supporting device according to a third embodiment of the present invention.

Figure 21:
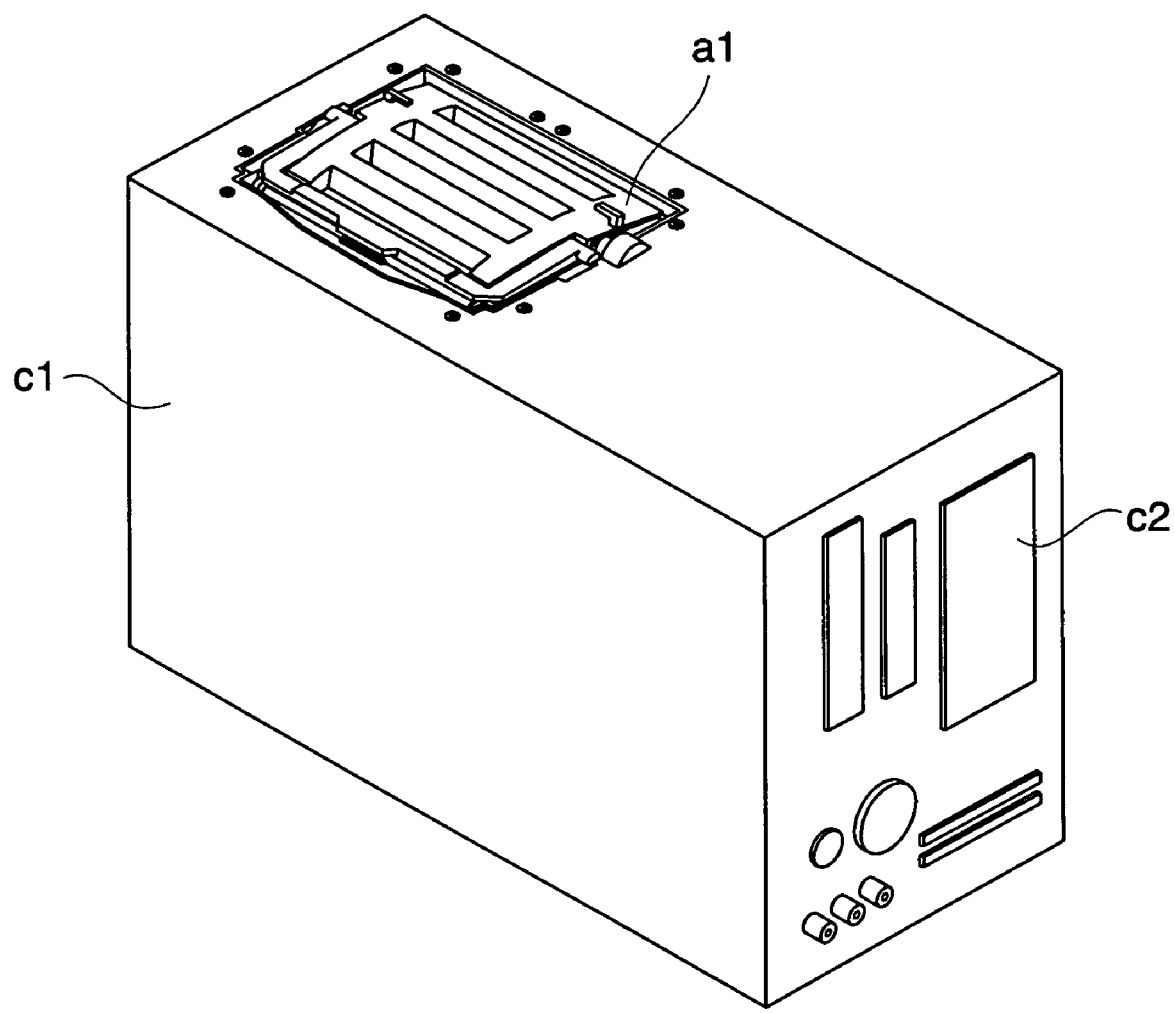
FIG. 21 is a perspective view showing a state in which a removable unit as a storage media supporting device according to a third embodiment of the present invention is housed in a unit housing section.
Figure 22:
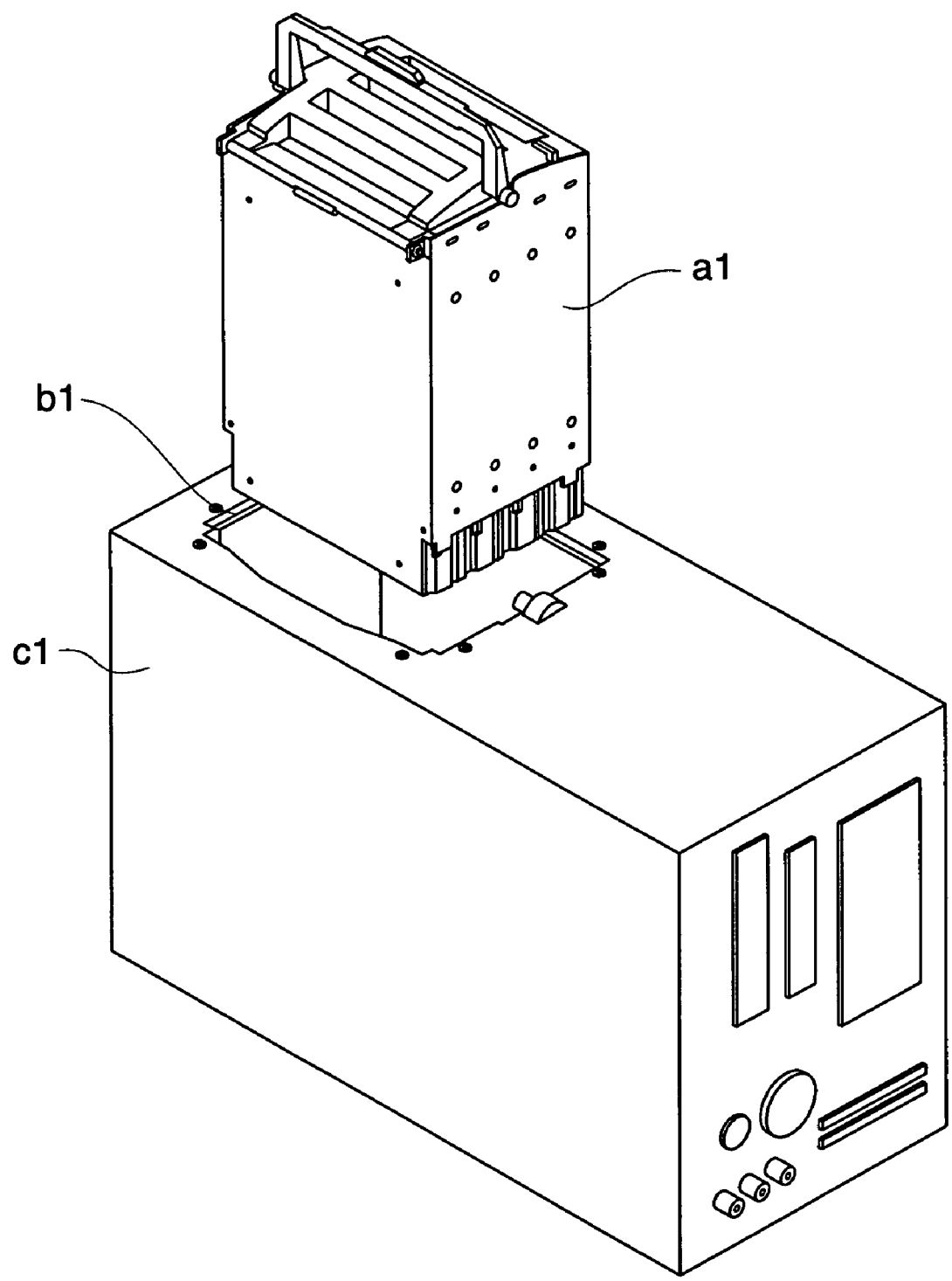
FIG. 22 is a perspective view showing a state in which the removable unit in FIG. 22 has been removed from the unit housing section.

FIGS. 21 and 22 are views showing the appearance of an information processing apparatus c1 including a removable unit a1 as the storage media supporting device according to the present embodiment, and a unit housing section b1 which houses the removable unit a1. FIG. 21 shows a state in which the removable unit a1 is housed in the unit housing section b1, and FIG. 22 shows a state in which the removable unit a1 has been ejected from the unit housing section b1.

Figure 23:
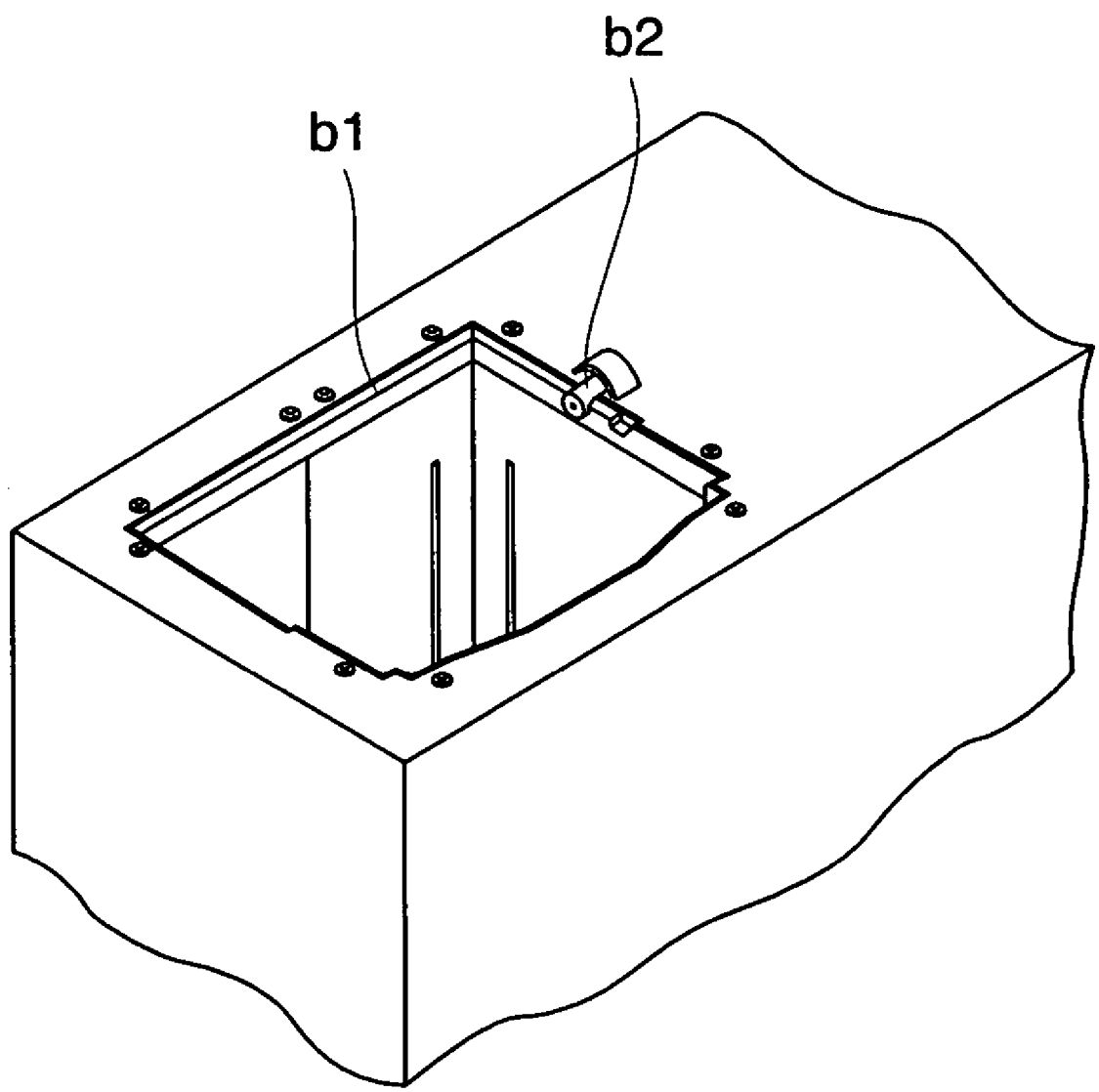
FIG. 23 is a perspective view showing the construction of the unit housing section appearing in FIG. 22.

FIG. 23 is a view showing the construction of the unit housing section b1.

As shown in FIG. 23, a solenoid b2 is attached to a side of the unit housing section b1, and is activated in response to an instruction signal from the information processing apparatus c1.

Figure 24:
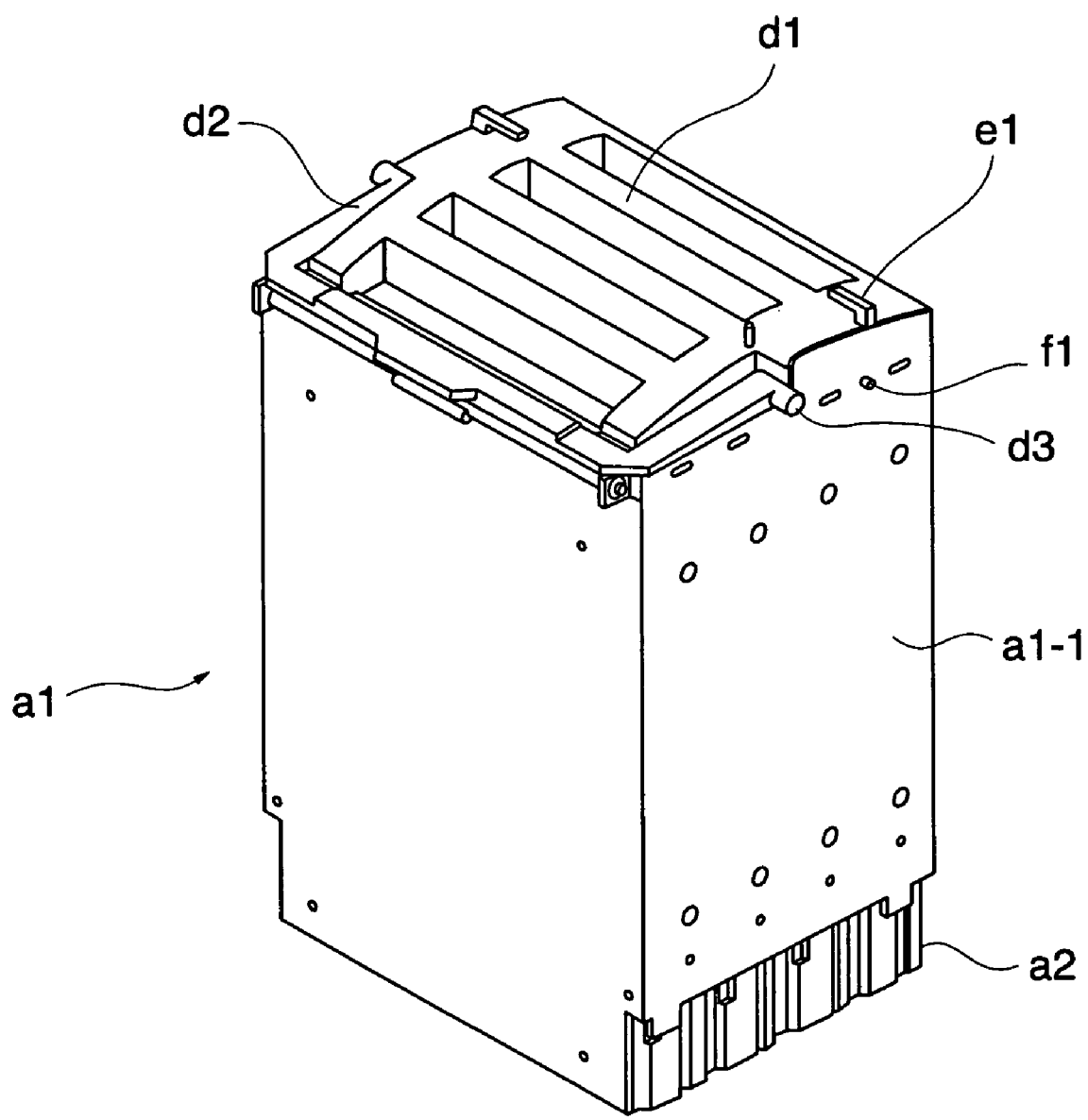
FIG. 24 is a perspective view showing the construction of the removable unit appearing in FIG. 21.
Figure 25:
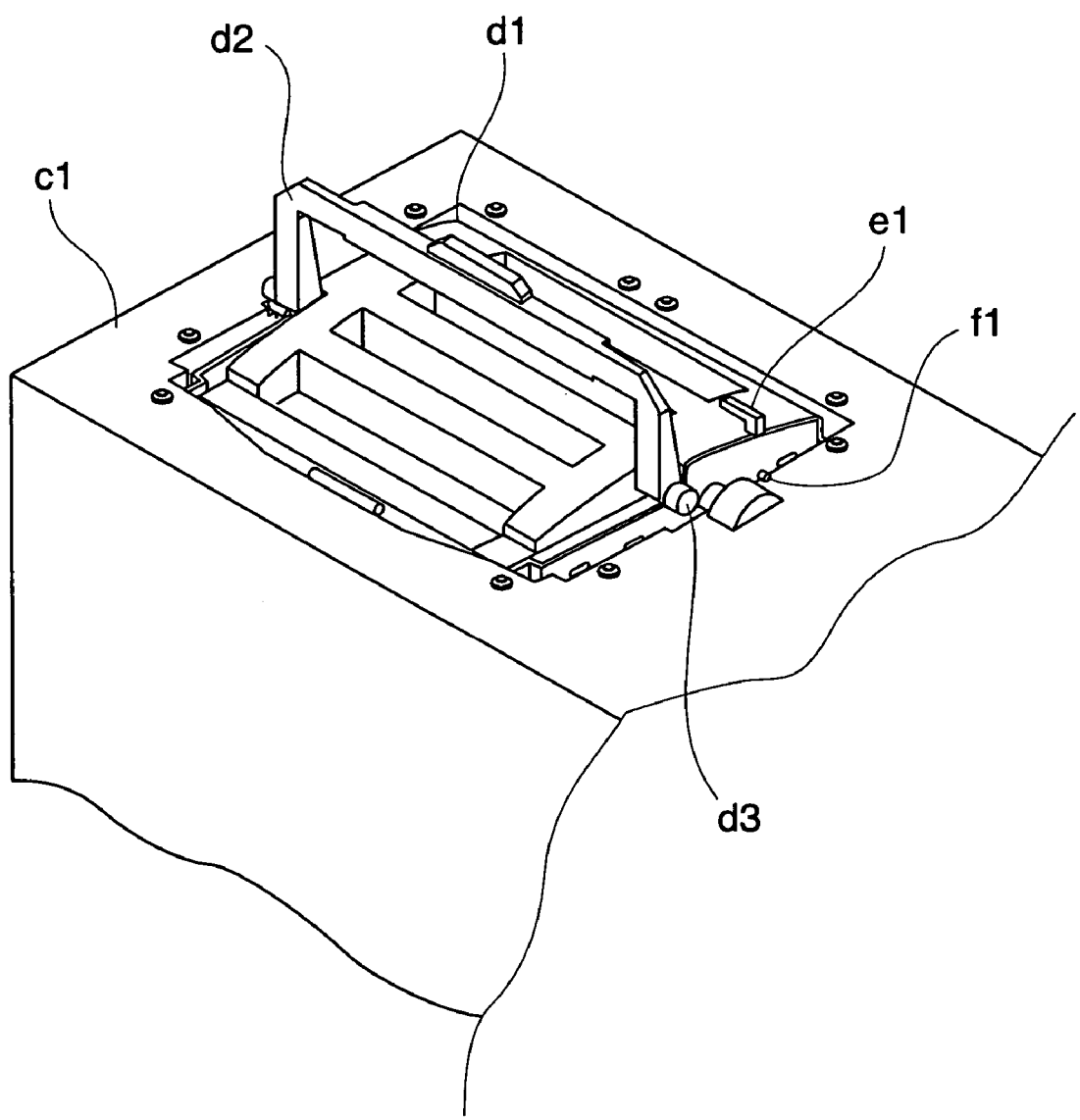
FIG. 25 is a fragmentary perspective view showing a state in which the removable unit appearing in FIG. 21 is removed from the main body of an information processing apparatus.

A description will now be given of the construction of the removable unit a1 with reference to FIG. 24.

The removable unit a1 is capable of housing up to four removable disks a2, and being directly housed in or removed from the unit housing section b1 provided in the information processing apparatus c1, so that the removable unit a1 can be stored.

A cover unit comprised of a cover d1 and a handle d2 is attached to the entrance of a housing section in the removable unit a1, and is provided with a lock mechanism including a hook e1. Also, a shaft f1 is mounted in a side wall a1-1 of the removable unit a1, so that the engagement between the shaft f1 and the lock mechanism restricts opening and closing of the cover d1.

To eject the removable unit a1 from the information processing apparatus c1, the handle d2 is rotated upward about a handle shaft d3, and is pulled up.

Figure 26:
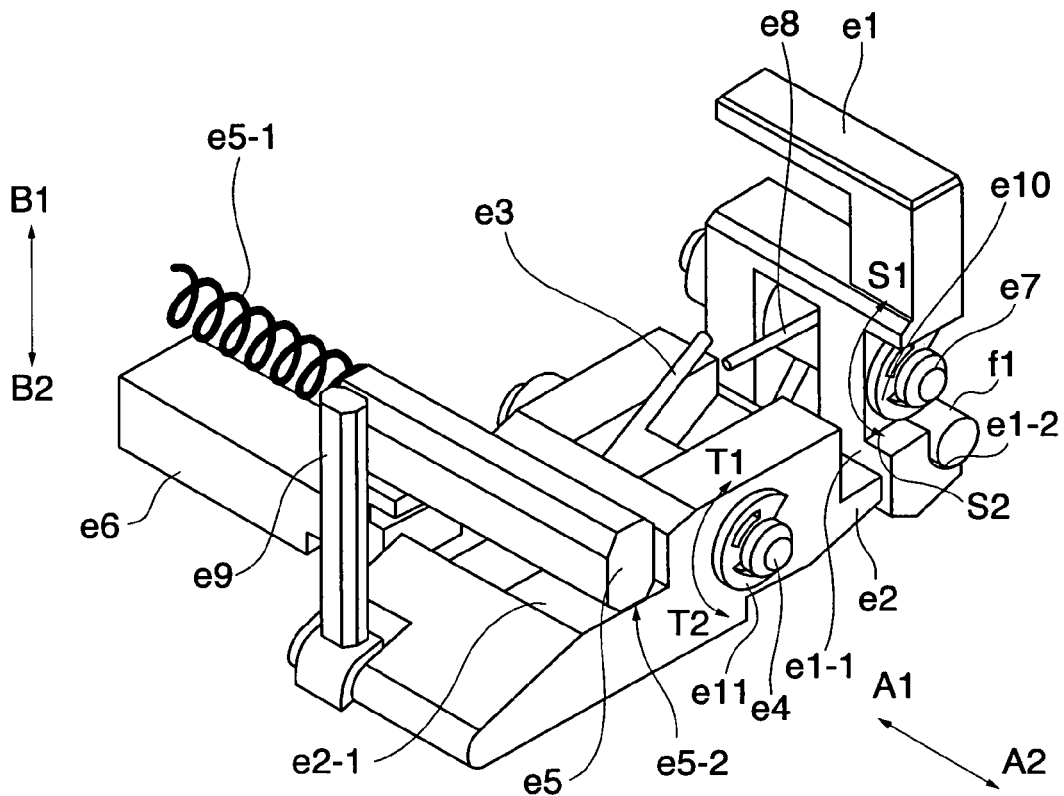
FIG. 26 is a perspective view showing a lock mechanism in a state in which a cover for the removable unit according to the third embodiment is closed and locked.
Figure 27:
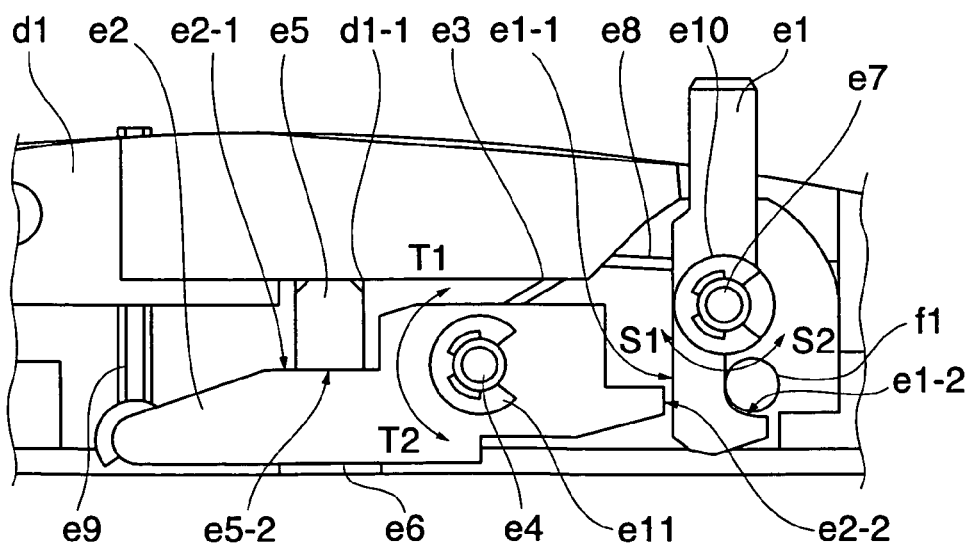
FIG. 27 is a side view showing the lock mechanism appearing in FIG. 26.
Figure 28:
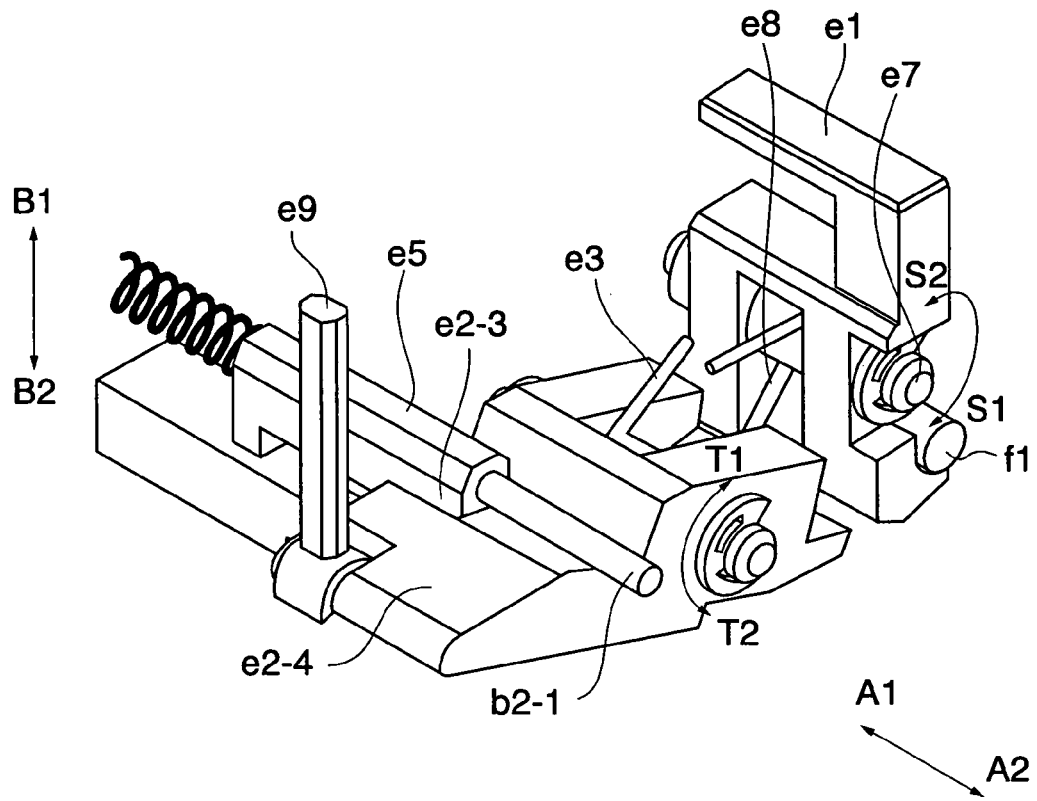
FIG. 28 is a perspective view showing the lock mechanism in a state in which a solenoid is operated in the removable unit according to the third embodiment.
Figure 29:
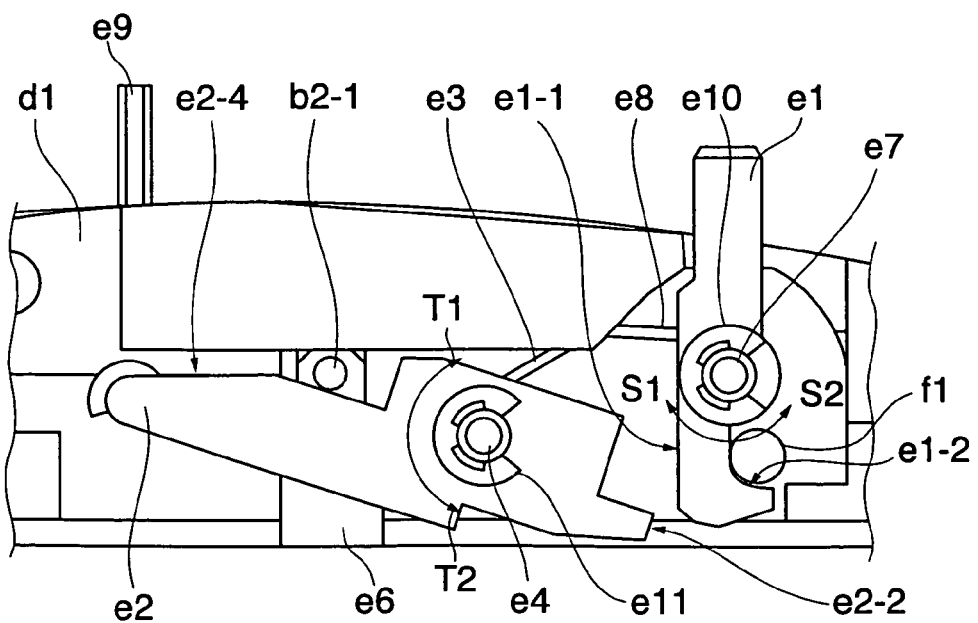
FIG. 29 is a side view showing the lock mechanism appearing in FIG. 28.
Figure 30:
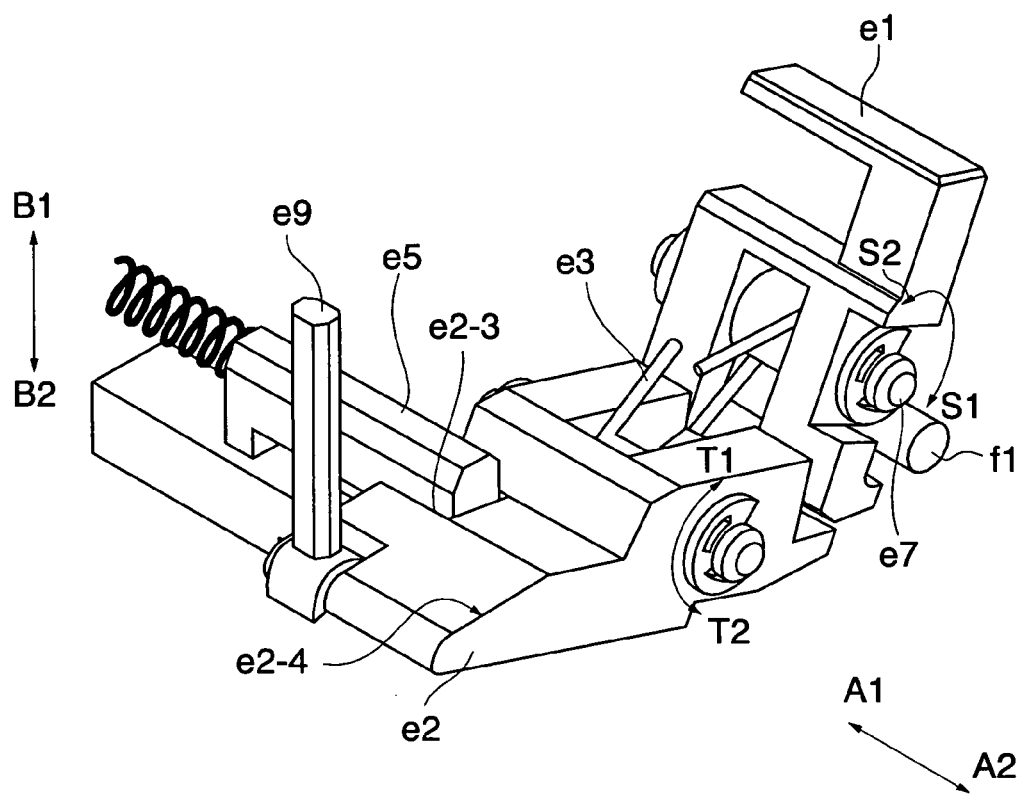
FIG. 30 is a perspective view showing the lock mechanism in a state in which the cover is opened in the removable unit according to the third embodiment.
Figure 31:
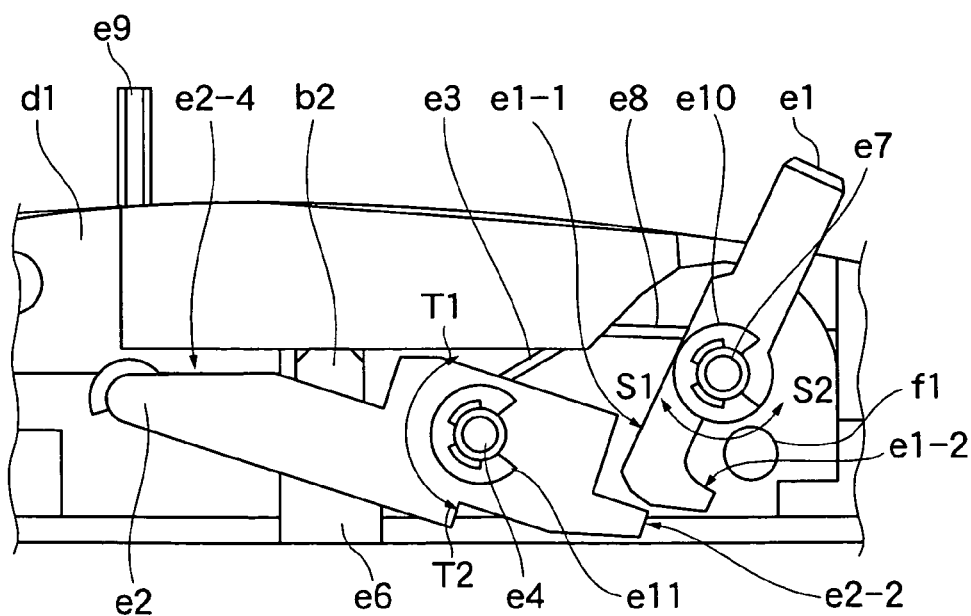
FIG. 31 is a plan view showing the lock mechanism appearing in FIG. 30.

FIGS. 26 to 31 show the construction of the lock mechanism which restricts opening and closing of the cover d1. FIGS. 26, 28, and 30 are perspective views showing the lock mechanism, although the cover d1 is not illustrated. FIGS. 27, 29, and 31 are side views showing the lock mechanism.

A description will now be given of a sequence in which the cover d1 is released from the hook e1 so as to be opened and closed with reference to FIGS. 26 to 31.

First, FIGS. 26 and 27 show a state in which the cover d1 is closed and locked.

The hook e1 is rotatably fitted on a shaft e7 fixed to the cover d1, and is inhibited from falling off from the shaft e7 by an E ring e10. A torsion coil spring e8 is also fitted on the shaft e7, and urges the hook e1 in a direction indicated by an arrow S2. Consequently, a nail e1-2 provided on the hook e1 comes into contact with the shaft f1 fixed to the side wall a1-1 of the removable unit a1 appearing in FIG. 24.

A stopper e2 is rotatably fitted on a shaft e4 fixed to the cover d1, and is prevented from falling off from the shaft e4 by an E ring e11. A torsion coil spring e3 is also fitted on the shaft e4, and urges the stopper e2 in a direction indicated by an arrow T1. A stopper e5 with a spring is inserted into a groove d1-1 formed in the cover d1, and is urged in a direction indicated by an arrow A2 by a spring e5-1 fitted in the groove d1-1. An upper surface e2-1 of the stopper e2 is in urging contact with a lower surface e5-2 of the stopper e5. A cover stopper e6 is provided to guide the stopper e5 and inhibit the stopper e5 from falling off.

When the hook e1 is rotated in a direction indicated by an arrow S1 from the illustrated state, a side face e1-1 of the hook e1 comes into contact with an end e2-2 of the stopper e2 to restrict the rotation of the stopper e2. Therefore, the nail e1-2 provided on the hook e-1 cannot get away from the shaft f1, and the cover d1 is not opened.

FIGS. 28 and 29 show a state in which the solenoid b2 is operative.

When the solenoid b2 is operative, a solenoid shaft b2-1 of the solenoid b2 appearing in FIG. 23 moves in a direction indicated by an arrow A1. The stopper e5 is urged by the solenoid shaft b2-1 to move in the direction indicated by the arrow A1. A groove e2-3 is provided for the stopper e2, into which the stopper e5 is fitted when it moves in the direction indicated by the arrow A1. If the stopper e5 is fitted into the groove e2-3, the stopper e2 is released from the stopper e5.

Since the stopper e2 is urged by the torsion coil spring e3, it rotates in the direction indicated by the arrow T1. An upper surface e2-4 of the stopper e2 then comes into contact with a lower surface of the cover d1, and therefore, the stopper e2 stops rotating. A manual lever e9 is engaged with the stopper e2, and hence the rotation of the stopper e2 in the direction indicated by the arrow T1 moves the manual lever e9 in a direction indicated by an arrow B1.

Then, the solenoid shaft b2-1 goes back in the direction indicated by the arrow A2 while the stopper e2 remains stationary, and in this state, the removal unit a1 is ejected form the information processing apparatus c1 as shown in FIG. 22.

Then, to open the cover d1, the hook e1, which is then released from the stopper e2, is manually rotated in the direction indicated by the arrow S1 as shown in FIGS. 30 and 31 to release the hook e1 from the shaft f1 connected to the side of the removable unit a1. This enables the cover d1 to be freely opened and closed until it is locked again.

Then, to lock the cover d1, the cover d1 is closed first, and then the manual lever e9 appearing in FIGS. 26 and 27 is pushed back in a direction indicated by an arrow B2, so that the stopper e2 is rotated in a direction indicated by an arrow T2. Since the stopper e5 fitted in the groove e2-2 of the stopper e3 is urged by the spring e5-1, the stopper e5 moves in the direction indicated by the arrow A2 to be brought back into the state in which the cover d1 is locked as shown in FIGS. 26 and 27.

The solenoid b2 is operated in response to authentication by a user based on a password input via a touch panel c2 as an input device provided at the front of the information processing apparatus c1 appearing in FIG. 21. Alternatively, a user may be authenticated based on identification information such as an IC card or a fingerprint. If an authenticating server is registered in advance, only an authenticated user can open the cover d1 for the removable unit a1. Specifically, only an authenticated user can replace removable hard disks, and it is therefore possible to prevent unauthorized users from replacing disks without consent to make the removable unit a1 inoperative.

Figure 32:
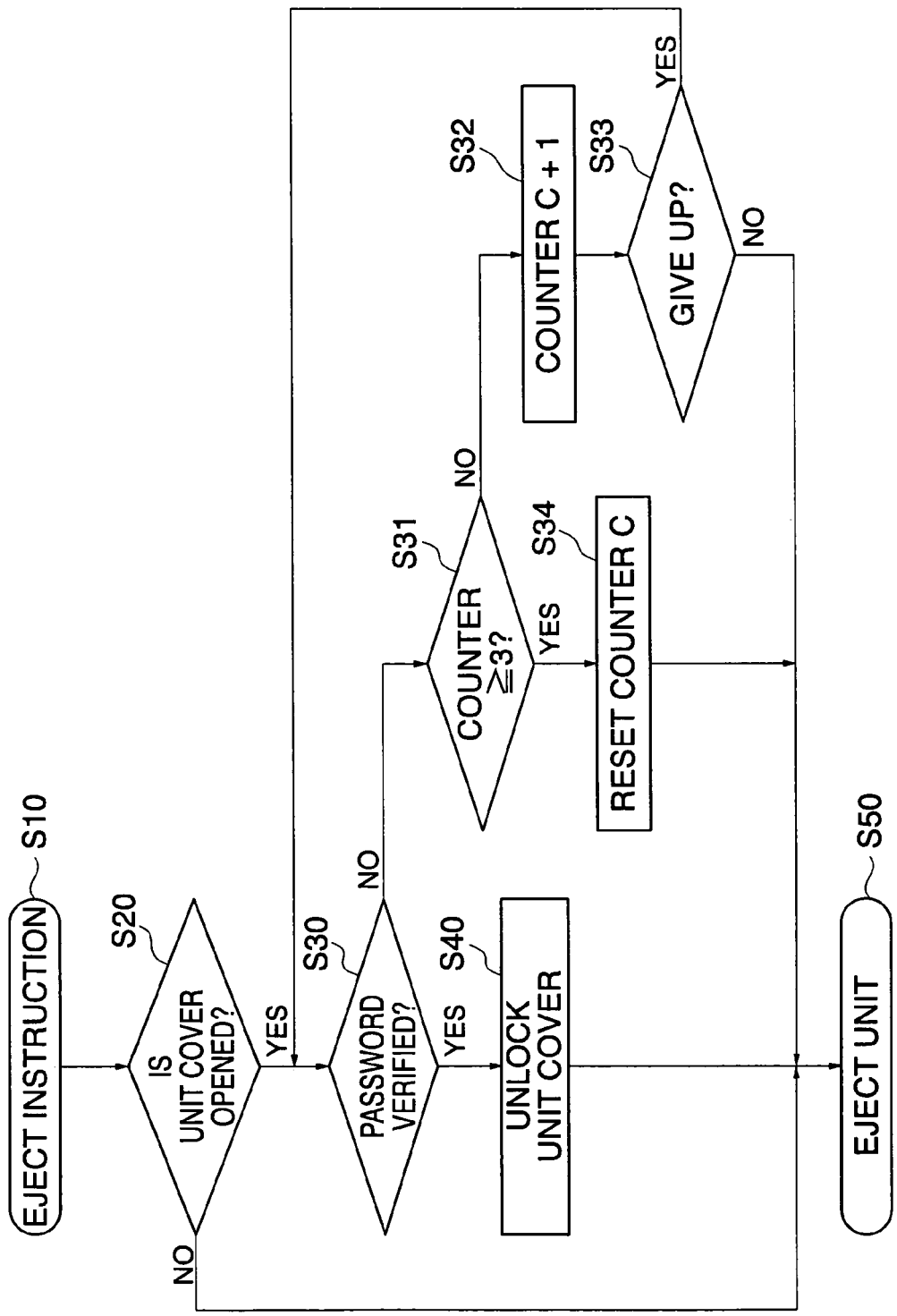
FIG. 32 is a flow chart showing a removable unit cover controlling process which is carried out when the removable unit according to the third embodiment is attached to/removed from the information processing apparatus.

FIG. 32 is a flow chart showing a removable unit cover controlling process carried out when the removable unit a1 is attached to/removed from the information processing apparatus c1.

First, upon the issuance of an instruction for ejecting the removable unit a1 (an ejecting instruction) in a step S10, the process proceeds to a step S20 wherein the user is prompted to decide whether to open the cover d1 for the removable unit a1. If the user decides not to open the cover d1, the process proceeds to a step S50 where the user ejects the removable unit a1 whose cover d1 cannot be opened from the information processing apparatus c1.

On the other hand, if the user decides to open the cover d1, the process proceeds to a step S30 where the user is authenticated based on a password or the like. The user inputs a password or the like registered in advance, and if the user is authenticated based on the password, the process proceeds to a step S40. In the step S40, the solenoid b2 is operated to unlock the cover d1. Then, the user ejects the removable unit a1 whose cover d1 can be opened from the information processing apparatus c1.

On the other hand, if the password is not verified in the step S30, the process proceeds to a step S31 where the count value of a counter c which counts the number of times the user has input a password is checked. If the count value of the counter c is not less than 3, the process proceeds to a step S34 where the counter c is reset (to "0"), and the process proceeds to a step S50.

On the other hand, if the count value of the counter c is smaller than 3, the process proceeds to a step S32 where the counter c is incremented by 1, and the process proceeds to a step S33. In the step S33, the user is prompted to decide whether the user inputs a password once again or not. If the user decides to give up (inputting a password), the process proceeds to the step S50, and on the other hand, if the use decides to input a password once again, the process proceeds to the step S30. Namely, a password can be verified up to three times in the step S30.

Figure 33A:
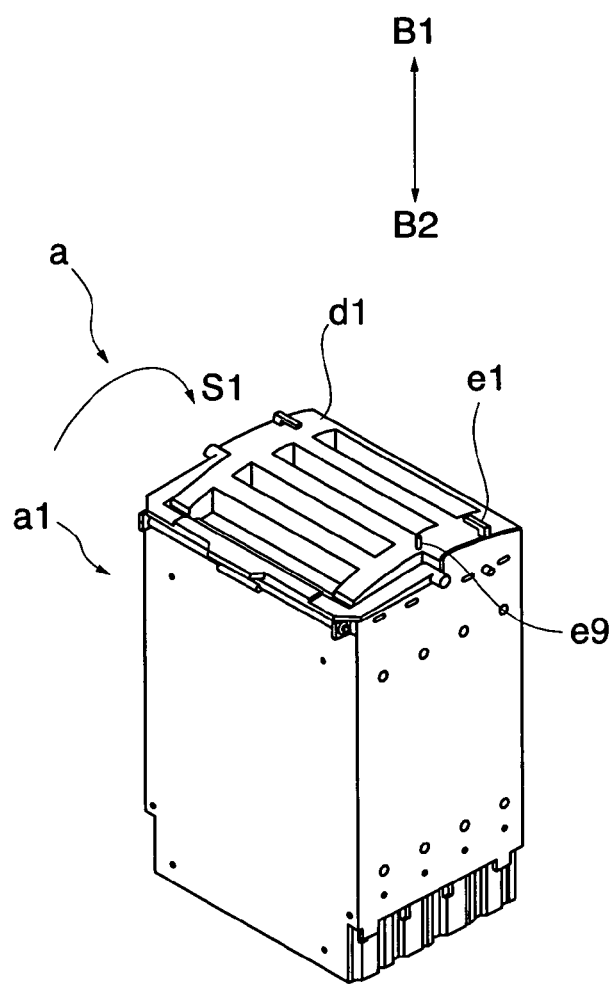
FIGS. 33A and 33B are diagrams useful in explaining operations performed by the user when he/she removes the removable unit according to the third embodiment in a state in which the cover can be opened.
Figure 33B:
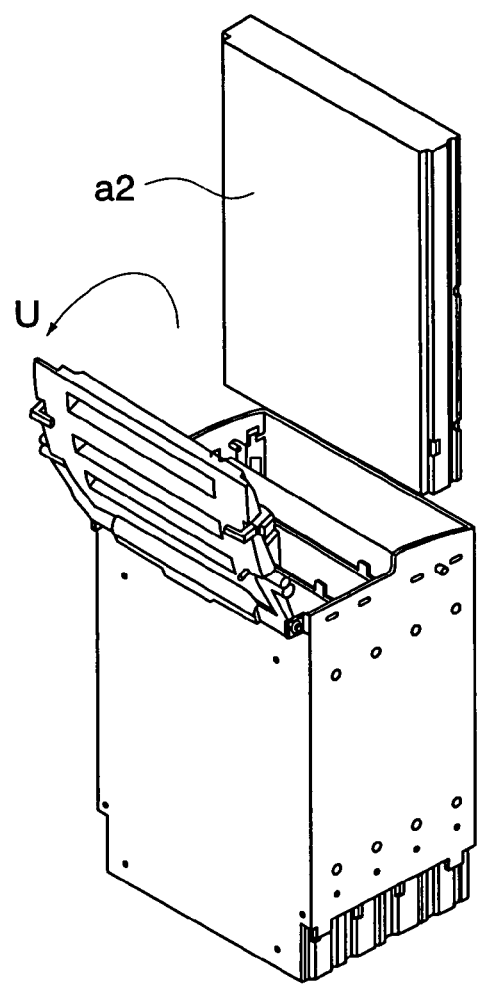

Referring next to FIGS. 33A and 33B, a description will be given of operations performed by a user when he/she ejects the removable unit a1 whose cover d1 can be opened (in the state shown in FIGS. 28 and 29) from the information processing apparatus c1.

First, as shown in FIG. 33A, the user rotates the hook e1, which locks the cover d1 for the removable unit al, in a direction indicated by the arrow S1 to unlock the cover d1 (refer to FIGS. 30 and 31).

Then, as shown in FIG. 33B, the cover d1 is rotated in a direction indicated by an arrow U to open the cover d1. Then, the user carries out such operations as replacement of removable disks a2. Upon the completion of the operations, the user closes the cover d1, and pushes the manual lever e9 in the direction indicated by the arrow B2 to lock the cover d1.

It should be noted that once the manual lever e9 has been pushed to lock the cover d1, the lock mechanism is brought into the state shown in FIG. 26, so that the cover d1 cannot be manually unlocked.

As described above, according to the present embodiment, since the removable unit is provided with the openable and closable cover for restricting the ejection of storage media, so that the storage media can be prevented from being attached/removed by mistake, and also can be prevented from being lost or stolen. This improves security for storage of data. Further, since it is possible for a user to decide whether the cover for the removable unit is to be locked or unlocked while the removable unit is attached to the information processing apparatus, there is no necessity of providing a physical key for the removable unit, and providing an actuator which unlocks the cover. Therefore, the removable unit can be simplified in construction.

Further, in the case where the removable unit is shared by a plurality of users, authenticated users who can open the openable and closable cover are registered in advance based on their passwords or the like, and this makes it easier to manage data, and improves security.

What is claimed is:

1. An information processing apparatus to which a storage media supporting device supporting at least one storage medium is removably attached, comprising:

connecting means for electrically connecting to the storage medium within the storage media supporting device when the storage media supporting device is attached to the information processing apparatus;

contents detecting means for detecting contents of data stored in the storage medium via said connecting means;

control means for changing a visible identifier provided on the storage media supporting device into a state corresponding to a result of detection by said contents detecting means; and setting means operable before the storage media supporting device is removed from the information processing apparatus, to set in advance whether the identifier is to be manually changeable in a state in which the storage media supporting device has been removed.

2. An information processing apparatus according to claim 1, further comprising driving means for transmitting a changing force to the identifier of the storage media supporting device attached to the information processing apparatus;

and wherein said contents detecting means detects whether at least one storage medium stores system data for activating a RAID system in a case where a plurality of storage media are supported in the storage media supporting device; and said control means causes said driving means to change the identifier into such a state as to indicate that at least one storage medium stores the system data when said contents detecting means detects that at least one storage medium stores the system data.

3. An information processing apparatus according to claim 1, further comprising:

identifier detecting means for detecting the identifier of the storage media supporting device attached to the information processing apparatus; and selecting means for selecting a way of accessing the storage medium within the storage media supporting device according to a result of detection by said identifier detecting means.

4. An information processing apparatus according to claim 3, wherein said identifier detecting means detects a shape or a color of the identifier.

5. An information processing apparatus according to claim 1, further comprising inhibiting means for inhibiting the storage medium from being ejected from the storage media supporting device when said setting means makes a setting in advance such that the identifier is not to be manually changeable in the state in which the storage media supporting device has been removed.

6. An information processing apparatus according to claim 2, wherein said control means causes said driving means to change the identifier into such a state as to indicate that the storage medium has been ejected from the storage media supporting device when the storage medium is ejected from the storage media supporting device attached to the information processing apparatus.

7. A storage media supporting device that supports at least one storage medium and is removably attached to an information processing apparatus, comprising:

a housing;

a visible identifier provided on said housing; and transmitting means for transmitting contents of data stored in the storage medium to the information processing apparatus according to control provided by the information processing apparatus when the storage media supporting device is attached to the information processing apparatus;

wherein said identifier is changed according to control provided by the information processing apparatus into a state corresponding to a result of detection by the information processing apparatus based on the contents of data transmitted by said transmitting means;

and wherein before the storage media supporting device is removed from the information processing apparatus, it is set in advance whether said identifier is to be manually changeable in a state in which the storage media supporting device has been removed.

8. A storage media supporting device according to claim 7, wherein said identifier is a rotatable body comprising display patterns identified according to shapes or colors.

9. A storage media supporting device according to claim 7, wherein said identifier is changed into such a state as to indicate presence of system data for activation of a RAID system when the information processing apparatus detects that at least one storage medium stores the system data.

10. A storage media supporting device according to claim 7, wherein the storage medium is inhibited from being ejected from the storage media supporting device when a setting is made in advance such that said identifier is not to be manually changeable in the state in which the storage media supporting device has been removed.

11. A storage media supporting device according to claim 7, wherein said identifier is changed into such a state as to indicate that the storage medium has been ejected from the storage media supporting device when the storage medium is ejected from the storage media supporting device.

12. An identifier changing method executed by an information processing apparatus to which a storage media supporting device supporting at least one storage medium is removably attached, comprising the steps of:

electrically connecting the information processing apparatus to the storage medium within the storage media supporting device when the storage media supporting device is attached to the information processing apparatus;

detecting contents of data stored in the storage medium;

changing a visible identifier provided on the storage media supporting device into a state corresponding to a result of detection in said detecting step; and setting in advance whether the identifier is to be manually changeable in a state in which the storage media supporting device has been removed before the storage media supporting device is removed from the information processing apparatus.

* * * * *